United States Patent [19]
Carr et al.

[11] Patent Number: 5,608,446
[45] Date of Patent: Mar. 4, 1997

[54] APPARATUS AND METHOD FOR COMBINING HIGH BANDWIDTH AND LOW BANDWIDTH DATA TRANSFER

[75] Inventors: Daniel J. Carr, St. Charles; Eric L. Edberg; Venkata C. Majeti, both of Naperville; John L. Shepherd, Aurora, all of Ill.

[73] Assignee: Lucent Technologies Inc., Murray Hill, N.J.

[21] Appl. No.: 437,349

[22] Filed: May 9, 1995

Related U.S. Application Data

[63] Continuation-in-part of Ser. No. 221,348, Mar. 31, 1994.

[51] Int. Cl.$^6$ ........................................................ H04N 7/14
[52] U.S. Cl. .................................. 348/6; 455/5.1; 348/13
[58] Field of Search .................................... 348/7, 12, 13, 348/6, 17, 14; 455/5.1, 4.2; 395/200.5; H04N 7/10, 7/14

[56] References Cited

U.S. PATENT DOCUMENTS

| 5,142,532 | 8/1992 | Adams | 455/5.1 |
|---|---|---|---|
| 5,253,341 | 10/1993 | Normanith | 348/12 X |
| 5,347,304 | 9/1994 | Maura et al. | 348/12 |
| 5,410,343 | 4/1995 | Coddington et al. | 348/12 |

*Primary Examiner*—Victor R. Kostak
*Attorney, Agent, or Firm*—Gordon E. Nelson

[57] ABSTRACT

Data communications apparatus and methods employing a bidirectional low bandwidth channel and a unidirectional high bandwidth channel. A PC is coupled to an information source by a communications system which provides both a bidirectional low bandwidth channel between the PC and the information source and a high bandwidth channel in which the information source is the source and the PC is the sink. A component of the communications system termed the director responds to a message received in the low bandwidth channel by switching the information being sent from the information source to the PC to the high or low bandwidth channel as specified in the message. The message may come either from the PC or the information source. A graphical user interface at the PC provides the user with "buttons" to specify the bandwidth. The apparatus and methods may be advantageously employed to provide telecommuting services.

7 Claims, 11 Drawing Sheets ic # APPARATUS AND METHOD FOR COMBINING HIGH BANDWIDTH AND LOW BANDWIDTH DATA TRANSFER

CROSS-REFERENCE TO RELATED APPLICATION

This application is a continuation-in-part of U.S. patent application Ser. No. 08/221348, Apparatus and Method for Integrating Downstream Data Transfer Over a Cable Television Channel with Upstream Data Carried by Other Media, which is in turn related to U.S. application Ser. No. 08/221336, Customer Premises Equipment Receives High-Speed Downstream Data Over A Cable Television System and Transmits Lower Speed Upstream Signaling On A Separate Channel, and U.S. application Ser. No. 08/221340, entitled Apparatus And Method For Displaying An Alert To An Individual Personal Computer User Via The User's Television Connected To A Cable Television System All three of the related patent applications were filed on Mar. 31, 1994.

This application contains the complete Detailed Description and Drawing of its parent. The new description begins at the section titled Using the Bidirectional Low-speed Communications Channel and the new Figures begin with FIG. 6.

BACKGROUND OF THE INVENTION

This invention is generally directed to utilization of high bandwidth channels available on existing cable television systems to serve personal computer users. This invention is more specifically directed to a system which is used to control the apparatus and method disclosed in the parent of the present apparatus. The apparatus and method of the parent application provides an intelligent split channel bridging unit which integrates and controls communications sent on high bandwidth downlink cable television channels with lower bandwidth bidirectional information sent to/from users over another media, such as the public switched telephone network.

It is an object of the invention of the present patent application to further increase the usefulness of the apparatus and method of the parent application by providing systems for controlling the use of the bidirectional low bandwidth channel and the unidirectional high bandwidth channel.

SUMMARY OF THE INVENTION

The object of the invention is attained by systems implemented in the apparatus of the parent application which permit switching the delivery of information from the information source to the user between the bidirectional low bandwidth channel and the unidirectional high bandwidth channel. In one embodiment, the switching is done in response to input from the user of the premises equipment; in others, it may be done in response to input from the information source.

The systems include a director implemented in control processor 48 which maintains the bidirectional low bandwidth channel and switches to the high bandwidth channel in response to a command and a wrapper implemented in personal computer 74 which permits a user of personal computer 74 to choose between the low bandwidth channel and the high bandwidth channel and responds to the choice by sending the director a channel change message via the low bandwidth channel. In other aspects of the invention, the director remains available via the low bandwidth channel even while the high bandwidth channel is in use and the wrapper provides a GUI for making the selection. The existence of the director and the fact that the user chooses the bandwidth also permit extremely flexible billing schemes.

Reference numbers of items first shown in FIGS. 6–18 have two parts: the two rightmost digits specify a reference number in a figure and the remaining digits specify the figure. The reference number 601 thus identifies an item first shown in FIG. 6.

DETAILED DESCRIPTION

Figure 1:
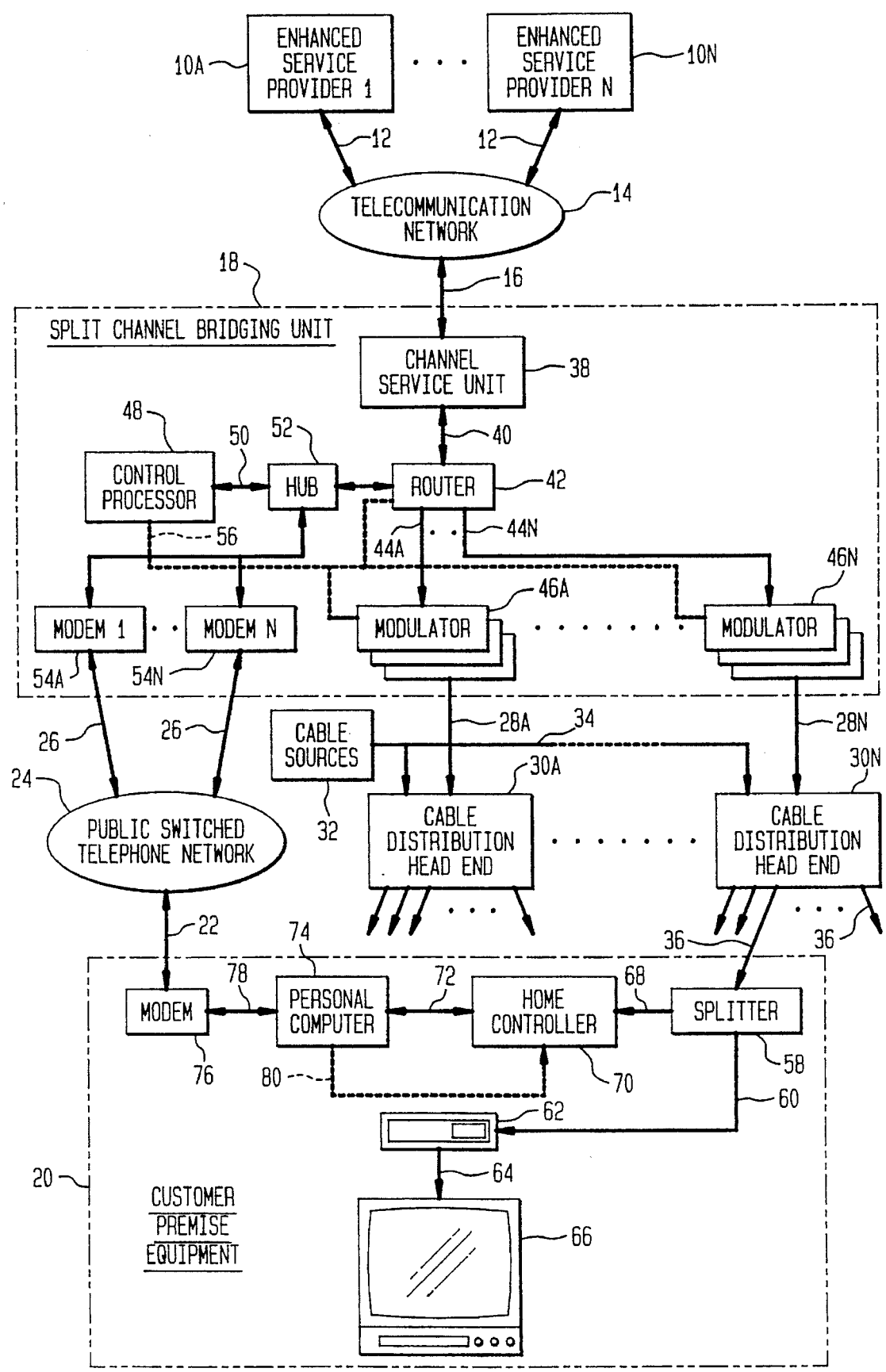
FIG. 1 illustrates a communication system in accordance with an embodiment of the present invention.

FIG. 1 illustrates a communication network in accordance with the present invention in which a plurality of enhanced service providers (ESP) 10A–10N are connected by respective high-speed communication channels 12 with telecommunication network 14. The channels 12 may comprise T1, T3, SMDS, SONET, or ATM channels; the telecommunication network 14 may comprise a conventional high-speed digital communication network capable of handling packet communications. A high-speed communication channel 16 provides communications between the enhanced service providers 10A–10N as supported by telecommunication network 14 and the split channel bridging unit (SCBU) 18. In the illustrative example, the enhanced service providers may consist of individual database providers or gateway service providers which collect a plurality of database information providers into a group allowing users to access any of the databases of the group by a single channel connected to the gateway.

In accordance with an embodiment of the present invention, a user or subscriber utilizes customer premises equipment 20 to transmit requests for information from a service provider subscribed to by the user by communication channel 22, through a public switched telephone network (PSTN) 24 and corresponding communication channels 26 to the split channel bridging unit 18. The request is routed by the split channel signaling unit to the corresponding enhanced service provider to which the request was directed.

User to ESP to SCBU signaling is referred to as upstream signaling. ESP to user or SCBU to user signaling is referred to as downstream signaling, which travels over the PSTN as well. The downstream traffic is expected to contain low-speed authentication and login information, which requires point-to-point connections over the PSTN.

In response to a request for information services, the information service provider may transmit a plurality of packets of information addressed to the requesting user by a communication channel 12, telecommunication network 14, and channel 16 to split channel bridging unit 18. The split channel bridging unit receives the digital information contained in packets and may translate it into a broadband signal imposed on an RF carrier which is transmitted over a communication channel 28 to the one of the cable television distribution head-ends 30A–30N which serves the corresponding subscriber. Other sources of information and cable television programming is delivered to the cable distribution head-ends by cable sources 32 over communication channels 34. The head-end units multiplex the received signals into cable television bandwidth signals such as comprising 6 megahertz channels which are then broadcast by respective cable systems to the cable TV subscribers associated with each head-end distributor. Thus, many users can be served by one 6 megahertz channel.

The customer premises equipment 20 receives the multiplexer cable TV signals on a conventional television cable 36. The customer premises equipment splits the cable television signals and sends one portion to a set top box 62 thereby, permitting the subscriber to use the set top box 62 to select the appropriate channel for viewing on a television 66 connected to the set top box 62. A home controller 70, which receives the other portion of the split signal, demodulates the RF channel which carries the information originated by the enhanced service and transmits to a personal computer 74 of the user, data addressed to the particular user. This completes the communication loop in which information is provided to the user in response to a transmitted request for such information. Thus, in accordance with the present invention, the user is provided with a relatively low-speed data channel to carry requests to the enhanced service providers while providing a relatively high-speed channel from the service providers by means of a cable television distribution system which serves the corresponding user.

The split-channel bridging unit 18 utilizes a channel service unit 38 such as from Digital Link Corporation, that communicates over the high-speed channel 16 with telecommunication network 14. A high-speed communication channel 40 connects the channel service unit to a router 42 such as a from Cisco Corporation. The router routes information packets transmitted by the enhanced service providers to one of modulators 46A–46N over corresponding communication channels 44A–44N. The modulator to which the packet of information is transmitted being dependent upon which cable television head-end unit serves the subscriber to which the packet of information is destined. Thus, the router segregates the packets for distribution to a modulator based on the particular group of users served by a cable television head end. A control processor 48 is preferably coupled by a bidirectional communication network 50 such as an ETHERNET™ network which may utilize a hub 52 which is connected to router 42 and a plurality of modems 54A–54N. The processor 48 contains a database containing records relating to each user (subscriber) served by the split-channel bridging unit and provides information required by router 42 in order to permit the router to properly route data to the appropriate destination cable television head-end unit. The modems 54A–54N may comprise dial-up modems capable of duplex operation over the public switched telephone network such as at speeds less than 30 kilobits per second. These modems provide terminations for dial-up links established by the user which are initiated at the beginning of a communication session in order to make requests of a service provider. During the communication session, each modem provides a duplex communication link between the customer premise equipment 20 and at least one of the enhanced service providers 10A–10N. The modems translate the incoming analog signals into digital format carried by the ETHERNET network 50. The control processor 48 manages communication with regard to the ETHERNET network 50 and controls the transmission of the data received by the modem to router 42 which incorporates such data into a packet transmitted by the channel service unit 38 to the destination enhanced service provider. A control channel 56 couples the control processor 48 with router 42 and modulators 46A–46N. This gives the control processor 48 a communication link in which to transmit control information and signaling to these devices and received status information. This enables the control processor to initialize the router and modulators, to update configuration and routing tables, to monitor status, and to collect measurement information.

The customer premises equipment 20 is served by a conventional cable television cable 36 carrying RF modulated channels assembled and transmitted by cable television distribution head-end unit 30N. The cable 36 is terminated at an RF signal splitter 58 which splits part of the signal onto cable 60 which is connected to a set top box 62. The set top box provides its normal cable television decoding function under the control of the user and provides a single television channel carried by cable 60 which is then transmitted by cable 64 to television 66. RF signal splitter 58 also provides the received signals on communication channel 68 to home controller 70. The home controller 70 demodulates the RF channel on which the information is transmitted from the enhanced service provider. The home controller further provides a packet bridging/routing function in which packets addressed to the specific customer premises equipment, i.e. a specific user, are translated onto a communication channel 72 connected to the user's personal computer 74. Thus, the personal computer receives information which is addressed to the user as transmitted over the cable television system thereby enabling substantially higher transmission rates to be accomplished from the enhanced service provider to the end user as contrasted with the rate at which information could be transmitted from the user by modem 76. s used herein, "modem" means a bidirectional interface between a computer and communications channel; it may utilize analog or digital signaling depending on the communication channel. It will be apparent to those skilled in the art that the user's modem could be physically incorporated as part of the home controller. The personal computer 74 provides control information and commands by communication link 80 to home controller 70; such commands may identify which RF channel is to be demodulated by the home controller and communication parameters affecting the transmission of the data between the home controller 70 and the personal computer 74.

Figure 2:
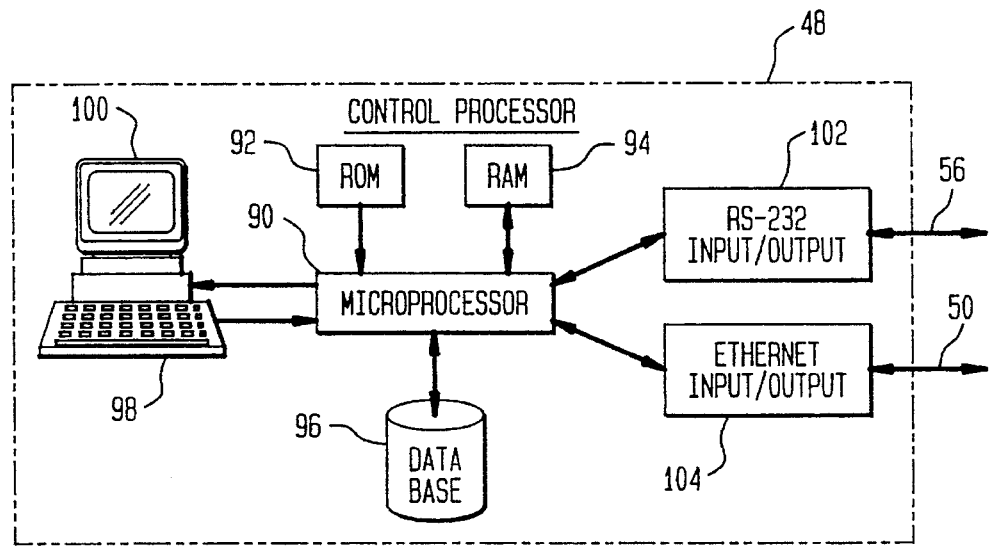
FIG. 2 is a block diagram of a control processor as referenced in FIG. 1.

FIG. 2 is a block diagram of control processor 48 which comprises part of the split-channel bridging unit 18 as shown in FIG. 1. The control processor includes a microprocessor 90 which is supported by read-only memory (ROM) 92, random access memory (RAM) 94, non-volatile storage consisting of database 96, and conventional keyboard 98 and monitor 100. An RS-232 input/output interface 102 is coupled to microprocessor 90 and provides communications between the microprocessor and control channel 56. An ETHERNET input/output interface 104 is coupled to the microprocessor 90 and provides communications between the microprocessor and ETHERNET channel 50.

The RS-232 link 56 provides basic initialization interface to the router and is also used for initializing the modulators and for collecting periodic status information from the modulators. The ETHERNET link 50 provides a higher bandwidth interface between the processor and the router. This interface is used to update routing tables on the router, to obtain status information, and to collect measurements. The ETHERNET interface is also used to carry user's messages to the processor, during session establishment (login) and tear down (logoff). The database 96 contains system configuration data, equipment information, network addresses, session records, subscribers' information, ESP information, authentication keys, and routing information. The router 42 obtains its routing tables from the processor 48 over the ETHERNET interface. It is the responsibility of the processor to download the routing tables to the router, and to maintain them through periodic auditing. The router 42 has its own local database, which is used solely by the router during a power-up. This local database is audited periodically by the processor to maintain data integrity and consistency across the system.

Figure 3:
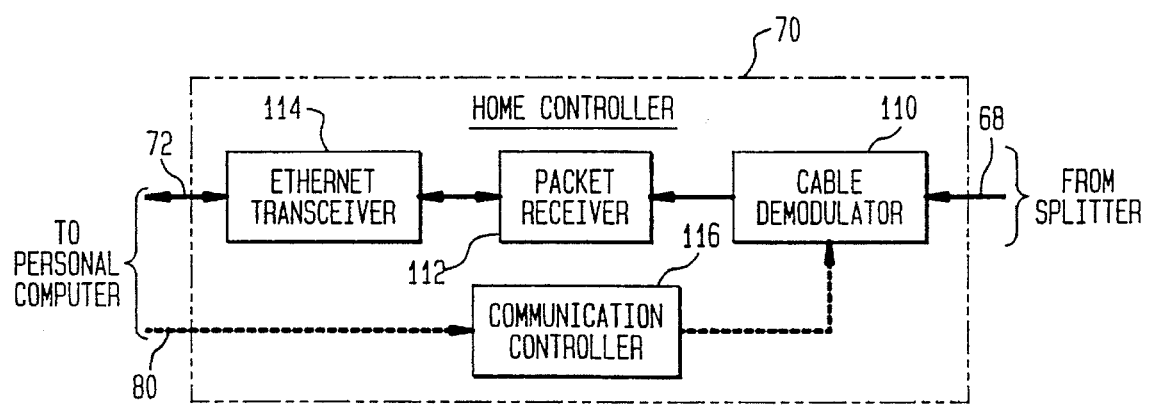
FIG. 3 is a block diagram of a home controller as referenced in FIG. 1.

FIG. 3 is a block diagram illustrating home controller 70 as shown in FIG. 1. Cable 68 which is coupled to cable demodulator 110 carries all of the channels encoded by the cable TV distribution head-end 30N. The cable demodulator is tuneable and is tuned to a channel which carries information originated by a service provider. The purpose of the demodulator is to demodulate the information carried by the RF signals into digital format which is then forwarded to packet receiver 112. The packet receiver 112 receives packets of information transmitted from the enhanced service providers and monitors for packets addressed to the specific customer premise equipment (user) served by the home controller. Packets which are addressed to the user served by the home controller are forwarded by packet receiver 112 to ETHERNET transceiver 114 which provides a communications input/output function over communication channel 72 with personal computer 74. Packets which are not addressed to the user are not transmitted by the packet receiver to the ETHERNET transceiver 114; such packets are discarded since they are not addressed to the particular user. It will be appreciated that the information can be subjected to higher security by using an encryption/decryption algorithm. Control channel 80 from personal computer 74 is coupled to communication controller 115 which provides a communication interface between the command signals transmitted by the personal computer and the signals required to control the timing of cable demodulator 110. Utilizing a tuneable cable demodulator permits the use of more than one transmission channel on the cable TV system to carry information from the service providers. For example, a large number of users supported by a single cable television system may require sufficient concurrent bandwidth to exceed a single channel and thus, the subscribers may be segregated into groups wherein each group is assigned a different communication channel, i.e. a different carrier frequency, upon which information is transmitted to the group by the service providers. The communication controller may comprise a microprocessor supported by conventional memory and communication input/output interfaces to accept communication such as from an RS-232 port with personal computer 74 and provides appropriate signals as required by the tuneable cable demodulator 110 in order to effectuate the control signals which define the RF channel to be demodulated. These requirements will be determined based upon the particular cable demodulator utilized and may consist of a digital address which corresponds to a particular carrier frequency or may require analog voltages or signals which can be supplied by the communication controller such as by utilizing a digital-to-analog converter.

Figure 4:
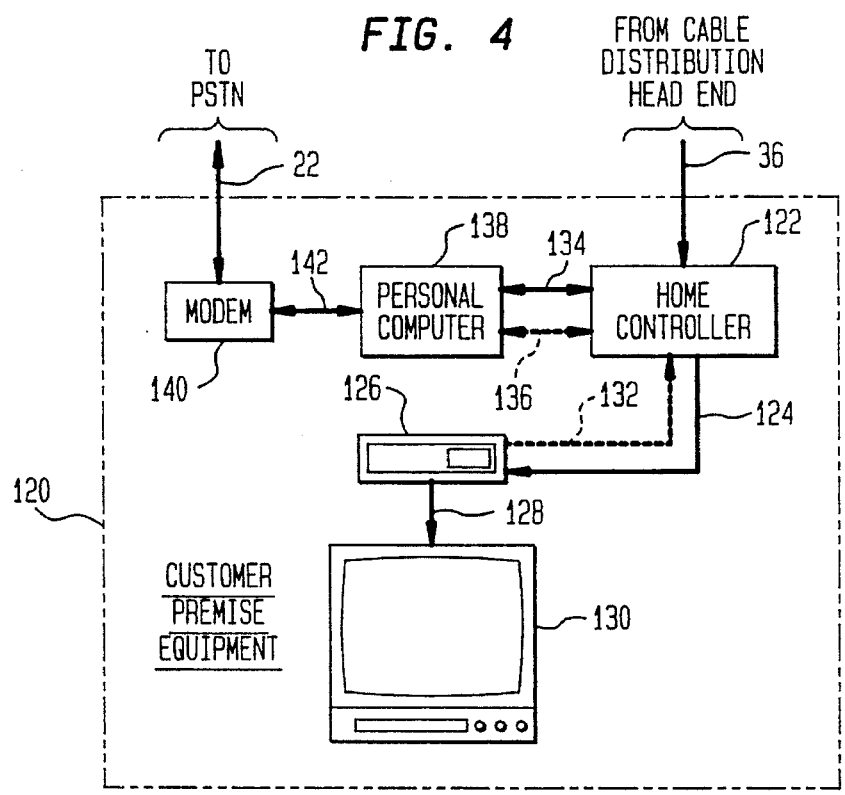
FIG. 4 is a block diagram of customer premises equipment in accordance with an alternative embodiment of the present invention.

FIG. 4 illustrates an alternative embodiment of customer premises equipment 120 which provides an enhanced capability to provide a visual alert displayed on the user's television. A home controller 122 receives the cable television signals transmitted over cable 36. The home controller 122, which is described in more detail below, provides output signals over cable 124 which is coupled to set top box 126. The home controller 122 has the capability of adding additional information to a broadcast television cable channel before passing the signal on cable 124 to the set top box 126. The television channel desired by the user is selected by the set top box which demultiplexes the selected channel and transmits the signal on cable 128 to user's television 130. The set top box 126 is connected to a control channel 132 which is utilized to transmit a signal from the set top box 126 which identifies the channel to which it is tuned to provide this information to home controller 122.

The home controller 122 is coupled to personal computer 138 by a data communication channel 134 which may comprise an ETHERNET communications protocol. The home controller 122 demodulates the data channel which may contain information addressed to the user and transmits any packets addressed to the particular user over channel 134 to the personal computer 138. The personal computer 138 is further coupled to home controller 122 by a control channel 136 which provides information to the home controller identifying the channel to which the cable demodulator is to be tuned. A modem 140 is coupled by communication channel 142 to personal computer 138 and is coupled to the public switched telephone network by telephone line 22. The modem provides a relatively low-speed data communication channel to be established through the PSTN between the enhanced service provider and the user. This permits the user to transmit requests to the service provider. The service providers can also initiate communications by the public switched telephone network with the user's personal computer 138 by initiating a call which can be automatically answered by modem 140. This capability will be explained below with regard to providing a visual alert to the user which is displayed on the user's television set.

Figure 5:
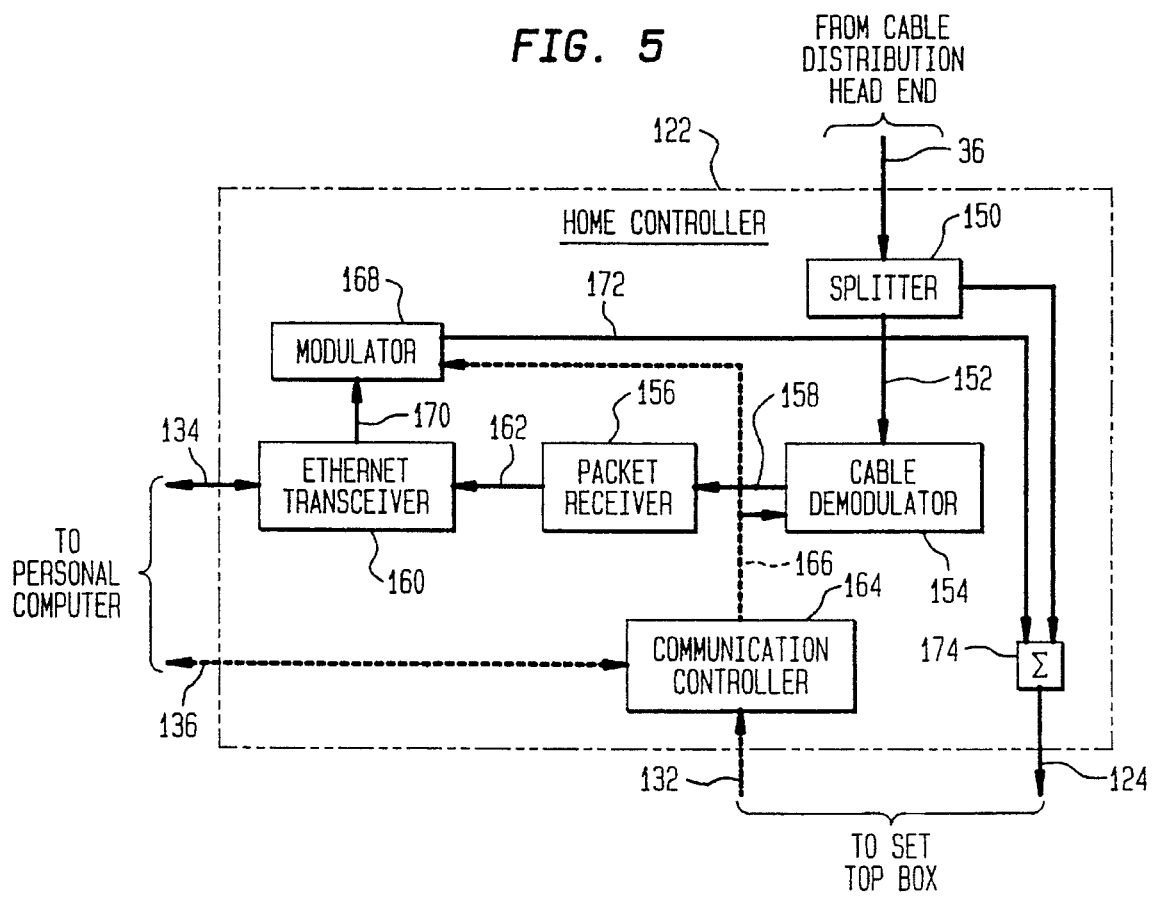
FIG. 5 is a block diagram of a home controller as referenced in FIG. 4.

FIG. 5 is a block diagram of an illustrative embodiment of a home controller 122 as referenced in FIG. 4. Channels received on cable 36 from the cable distribution head-end 30N are split by an internal RF splitter 150 which sends one of the sets of signals to cable demodulator 154 via cable 152. The cable demodulator demodulates the RF encoded signals contained in the channel to which the demodulator is tuned. The cable demodulator transmits in digital format the demodulated signals to packet receiver 156 via channel 158. The packet receiver 156 identifies those packets addressed to the specific user (customer premise equipment) and transmits such information to ETHERNET transceiver 160 via channel 162. Packets which are not addressed to the particular user are discarded, i.e. not transmitted to the ETHERNET transceiver. The ETHERNET transceiver 160 provides a communication link by channel 134 with personal computer 138. This permits data received from the cable distribution head-end 30N to be received by personal computer 74 over the cable television network. A control channel 136, such as an RS-232 channel, provides communications between the personal computer 138 and the communication controller 164 of the home controller 122. The communication controller is further connected by control channel 166 to cable demodulator 154 and modulator 168. Preferably, both the cable demodulator 154 and the modulator 168 are tuneable wherein the tuning of each is controlled in response to signals transmitted by the communication controller 164 via control channel 166. Communication controller 164 may comprise a microprocessor with associated memory and input/output communication interface peripherals. The communication controller receives information on channel 132 identifying the channel to which the set top box 126 is tuned. The communication controller 164 receives via channel 136 commands which control the cable demodulator 154 and modulator 168 including the channel to which each is tuned. The utilization of this function will be described later with regard to an example. The modulator 168 is coupled by channel 170 to ETHERNET transceiver 160 and receives information transmitted by channel 134 from personal computer 138 which defines the visual message to be displayed on the user's television. The modulator 168 comprises a tuneable RF modulator which encodes the digital information received over channel 170 and encodes same into appropriate television transmission signals suited to be transmitted to the user's television 130. The output of modulator 168 is carried by cable 172 to a summation or combiner circuit 174 which combines the output, if any, of modulator 168 with the other set of split signals representing the signals on the cable distribution head-end by channel 36. These combined signals are transmitted by cable 124 to the set top box 126.

EXAMPLE 1 OF OPERATION

One example of operation will best be understood by referring to FIG. 1. Assume that a user associated with customer premises equipment 20 desires to obtain travel information including high definition pictures of possible travel locations and stock market information about a particular stock from an enhanced service provider 10A. The user places a call over the public switched telephone network 24 by controlling modem 76 by personal computer 74. The user calls a predetermined number (or trunk group) assigned to modems 54A–54N of the split channel bridging unit 18. After establishing a two-way communication link between customer premise equipment 20 and the split channel bridging unit 18, the user transmits a code identifying enhanced service provider 10A as the source from which information will be sought. Control processor 48 receives the request, packages the request for service in a packet addressed to enhanced service provider 10A and transmits this packet to router 42 which forwards the packet by channel service unit 38 and communication network 14 to enhanced service provider 10A. Upon receiving the request for service, service provider 10A requests the user to provide a user identification code by transmitting a packet through telecommunication network 14, channel unit 38, and router 42 which routes the packet under the control of control processor 48 to the one of the modems 54A–54N to which the user has established a communication link. This data is transmitted via the modem and public switched telephone network 24 to modem 76 which transfers the information to personal computer 74 which in turn displays the information as a question on the monitor associated with the personal computer. Additional communications between the user and enhanced service provider 10A flow in a like manner until the communication path is verified and established permitting the user to make an inquiry of the substantive information sought. The transmission of such information constitutes secured, relatively low-speed, low bandwidth requirements which is suited to the modem-to-modem link over the PSTN.

Assume that the user now transmits a specific request for information concerning the price and volume history of a stock for the past week. This request is transmitted through the public switched telephone network 24 and routed to enhanced service provider 10A through router 42 in the manner previously described. In this example, enhanced service provider responds to the request by transmitting a reply packet of information containing the requested information along with packet header information specifying the total amount of information to be transmitted in response to this single request. In this illustrative example, the quantity of data is relatively low, for example, 1–5 kilobytes of data. This packet is received by router 42. The router transmits at least the packet header to control processor 48 which makes a determination of whether to have the information transmitted via the modem link over the public switched telephone network 24 or via the cable television distribution system utilizing the larger bandwidth channel carried by cable 36 to the user's customer premise equipment 20. In the illustrative example, a determination is made that the relatively small amount of data would be most efficiently handled and bandwidth conserved by the system by routing it via the modem and PSTN network. Control processor 48 then process the substantive information associated with the stock request and causes the data to be transmitted by one of modems 54A–54N over the PSTN link to the user's equipment 20.

The user now makes a second request for information concerning travel and requests high definition picture information be transmitted illustrating the facilities provided by five different hotels being considered by the user as a vacation destination. This request is transmitted by the PSTN network and arrives at service provider 10A. The service provider analyzes the request and assembles the requested information transmitting a first packet which contains at least a portion of the total requested information along with information contained in the header identifying the total quantity of information to be transmitted to the user in connection with this request. This packet is forwarded to router 42 and then to control processor 48 which decodes the total quantity of information to be transmitted. For high definition pictures, a substantial quantity of data, for example, greater than 1 megabyte of data, will be transmitted. In view of the substantial amount of data to be transmitted, the control processor checks its database and determines that bandwidth capacity is available for the picture information to be transmitted by cable distribution head-end 30N and cable 36. On determining that sufficient bandwidth can be made available for this request, the control processor transmits command information to router 42 directing the router to transmit this packet along with additional packets containing related information via cable 44N to modulator 46N which modulates the data onto an RF channel on cable 28N passed to the cable distribution head-end equipment 30N. This information will then be combined with other RF channels and then transmitted over cable 36 to the user's customer premise equipment 20. It should be noted that this system contemplates the cable television network being utilized in a broadcast mode in which all subscribers served by common cable distribution head-end equipment will receive the same information. The information will remain private since it is addressed to a specific user address; other users' packet receiver will not process the information and hence, will not have access to the information. This high definition picture information is then transmitted via splitter 58 to home controller 70 which demodulates the data carried on the RF channel, forwards the digitally formatted information to a packet receiver which then determines if the packet is addressed to the associated user. Upon determining an address match exists, the packet receiver transmits the information via an ETHERNET link 72 to personal computer 74 which receives the information and provides an appropriate display to the user, using the monitor associated with the personal computer 74. In this same manner, a plurality of packets containing the requested picture information will be transmitted via this same path to reach the user associated with customer premise equipment 20 thereby, fulfilling the user's request more quickly than could have been accommodated by using the public switched telephone network which would require a more restricted bandwidth and hence, a longer time to transmit the same quantity of information.

In the above example, the control processor 48 contains a database that includes the bandwidth capacity of each of the RF data channels associated with modulators 46A–46N in order to be able to provide efficient routing and control of information sent from the enhanced service providers to users via the cable television network. It will be appreciated by those skilled in the art that the intelligence required for making the decision of whether to use the PSTN data path or the cable TV channel(s) could also be made by each service provider. Such an alternative system would require that each service provider be provided with an ongoing update of channel availability for each of the high-speed RF channels available through modulators 46A–46N. Or, the ESP could be provided with a single threshold value of the quantity of data to be transmitted, which is used to determine if the data channels are to be sent over the PSTN or CATV network. Upon making a determination that a substantial quantity of data is to be transmitted to a given user, the service provider could then initiate a request for bandwidth allocation on the cable TV system which would be transmitted by router 42 to control processor 48 which could then assigned a specified bandwidth for a given period of time in order to accommodate the data to be transmitted from the service provider to the user. This type of system requires the cooperative interaction between enhanced service provider and the split channel bridging unit in order to allocate bandwidth and provide for efficient data transmission through the cable television network where appropriate. Such an alternative system has the disadvantage that additional overhead and packet transmissions are required in order to provide the negotiations between the split channel bridging unit 18 and each enhanced service provider in order assign and allocate bandwidth. Utilizing the split channel bridging unit 18 to control usage of the cable TV channels has the advantage that the entire system including all of the service providers are managed in a controlled manner thereby, minimizing the possibility of substantial overload conditions in which excessive data bandwidth is simultaneously requested by a plurality of service providers.

In the example in which the decision making of when to utilize the television RF network is made by the split channel bridging unit 18, it is conceivable that a plurality of users each served by the same cable distribution head-end 30N will request a substantial amount of data from a variety of service providers 10A–10N. Under such conditions, the control processor 48 will mediate the requests and provide control instructions and gating information which sets the amount of data which can be transmitted by any given service provider on the RF cable television network to a user in order to prevent bandwidth overflow conditions. Such decisions can be made on a priority basis depending on the nature of the information or the class of service subscribed to by the user or can be handled by allocate available bandwidth.

A further example of the flexibility of the system resides where modulator set 46N consists of a plurality of modulators each associated with a given RF channel of the cable system thereby, enabling a corresponding plurality of 6 megahertz bandwidth RF data channels to be made concurrently available to the cable distribution head-end 30N for retransmission on the cables 30 to the users. This permits the users to receive high-speed signals over the cable television network via one of a selectable number of RF channels. Under these circumstances, the control processor 48 has the additional responsibility of providing command instructions to router 42 identifying the RF channel on which data to a particular user is to be encoded. The processor 48 further has the responsibility for transmitting control information by the modem link and public switched telephone network 24 to the customer premises equipment 20 to cause the personal computer 74 to utilize the command channel 80 to send control information to home controller 70 causing the RF demodulator to be tuned to demodulate the corresponding RF channel on which the data will be sent to the user. This command signal from control processor 48 by personal computer 74 to home controller 70 will be required to be initiated and completed prior to the transmission of the data on the high-speed cable television channel in order to provide appropriate time for the customer premises equipment to be tuned to and be ready for receipt of the information.

A system in which a plurality of RF channels are available to each of the users provides additional flexibility and increased total bandwidth for data transmission thereby, maximizing the amount of data which can be concurrently transmitted through the cable television system to users. It will be apparent to those skilled in the art that this also places additional control responsibilities on control processor 48 in order to maintain an accurate database identifying assigned bandwidth allocations for transmissions to particular users over each of the RF cable television channels which can be concurrently utilized. It will be apparent to those skilled in the art that a system which utilizes only a single RF channel on the cable television network to transmit data to the users eliminates the need for control line 80 since the RF demodulator can be fixed tuned to the one available television RF channel upon which data is always received.

TELEVISION DISPLAY OF ALERT NOTICE

FIGS. 4 and 5 illustrate an alternative embodiment in accordance with the present invention with regard to a subscriber's customer premise equipment. In accordance with the capability facilitated by this embodiment, a notice can be displayed on the user's television set 130 in order to attempt to get the user's attention where the user does not respond to a message sent to the user's personal computer. A user may request that one of the enhanced service providers provide a monitoring service to alert the user when a predetermined condition exists. For example, the user may be asked to be alerted when a particular stock reaches a predetermined price. In accordance with this service, the enhanced service provider monitors the stock price of the subject stock and upon the stock hitting the targeted price, the enhanced service provider attempts to communicate notice of this condition to the subscriber which requested the monitoring service.

In an illustrative example, the enhanced service provider initiates communication with the user's customer premise equipment 20 by sending a communication initiation packet including the user's modem telephone number by router 42 to control processor 48. In response to receiving the communication request, control processor 48 activates one of modems 54A–54N and causes the modem to initiate a call through the public switched telephone network 24 to modem 140. Assuming that modem 140 is set to auto-answer, the modem answers the incoming call and alerts the personal computer 138 of an incoming call and the need to establish a communication link. Assuming that the personal computer is ON and is running a communication program, this attempt to provide an alert notice to the user will still fail if the user is not present at the personal computer to see the alert displayed on the screen of the computer's monitor. The absence of the user will be apparent by the lack of any response by the user via modem 140 in response to the notice signal. Preferably, the notice signal will request the user respond with a reply indicative that the message was received and may include a request to retransmit a particular code transmitted with the notice information to insure that the specific user was responding to the notice message.

Assume in this example that the user is not present at the personal computer and hence, does not send the appropriate response message. In accordance with one embodiment of the present invention, control processor 48 monitors for a predetermined period of time whether or not the user responds to a particular notice message. If the user does not respond in the predetermined time, control processor 48 initiates an interrogation request sent to the user's personal computer over the public switched telephone network requesting identification of the RF channel to which the set top box 126 is tuned. The personal computer initiates the command request on channel 136 via communication controller 164 and channel 132 to set top box 126. The set top box responds to the request by transmitting an identification of the channel to which the set top box is tuned and hence, the cable television RF channel being displayed on the user's television 130. This information is sent to controller 122 which relays the information by channel 136 to personal computer 138. This information is then routed by modem 140 back to control processor 48. The control processor, upon receiving the viewed channel information, generates a command signal sent by the PSTN and modem 140 to personal computer 138 directing the computer to send a command signal by channel 136 to communication controller 164 which causes the controller to initiate a command sequence on channel 166 causing modulator 168 to be tuned to the cable television RF channel being viewed by the user. The control processor 48 further transmits the notice message by the public switched telephone network to personal computer 138 which transmits the substance of the message on channel 134 to ETHERNET transceiver 160 and the home controller 122. The ETHERNET transceiver forwards the information to modulator 168 by channel 170 thereby causing the modulator to generate an RF signal which is transmitted to combiner network 174 causing a notice message to be combined with the incoming RF signal from splitter 150 and the combined signal being carried by cable 124 to set top box 128 which converts the subject RF channel to the channel being transmitted to television 130 by channel 128. Thus, the user or other persons viewing television 130 will observe a message being displayed such as on the lower one third of the television screen indicating that an alert message is waiting to be transmitted to a named user. In this manner, the user, or perhaps, a member of the user's household will observe the message as displayed on the television set 130 and thereby alert the user to contact the enhanced service provider to obtain the substantive information related to the notice message. A serial number may be associated with the given notice thereby, allowing the user to more directly access the particular message from the service provider.

It will be apparent to those skilled in the art that various modifications utilizing this alternative alert mechanism can be employed depending upon the system design. For example, should the user's telephone line 22 be occupied by a voice conversation, the control processor 48 may periodically retry to initiate communications with modem 140 at predetermined time intervals. Further, the home controller 122 may be designed to be capable of controlling the channel selected by the set top box 126 and may utilize this capability to periodically switch the set top box to another channel which carries the alert message transmitted by modulator 168 on the alternative RF channel for a predetermined period of time, such as 5 seconds at intervals such as at every one or two minutes. This provides an alternative mechanism for providing the alert message to the user by causing the set top box to periodically switch to an alternative RF channel which carries the alert message. This control can be initiated directly by personal computer 138 based on its internal programming in response to a signal received by modem 140 from control processor 48 to initiate the cycle, or may be controlled exclusively by the control processor which sends repetitive commands at the predetermined time intervals which is merely passed through by the personal computer to home controller 122. Further, modulator 168 could be connected directly to the television 130 and in parallel with the output of the set top box 126, thereby allowing the modulator to be fixed tuned to the output channel used by the set top box.

Should the user not be present at the customer premise equipment when such a visually displayed alert is presented on television 130, it may be desirable to incorporate an override control on set top box 126 which will cease the display of such alert messages in the case where others in the household are trying to view a program and do not desire to have the alert continued to be displayed. The user's personal computer can be programmed to store an alert message upon an indication from the set top box that the television is not ON; the computer causing the alert message to be displayed upon the first of the television or computer to be used.

Using the Bidirectional Low Bandwidth Communication Channel

An important feature of the system shown in FIG. 1 is that public telephone switched network 22 provides a bidirectional low bandwidth communication channel between customer premise equipment 20 and split channel bridging unit 18 and thereby to enhanced service provider 10. A user of customer premise equipment 20 is thus able not only to control delivery of information from service provider 10 via the high bandwidth channel provided by cable distribution system 30 to customer premise equipment 20 but also to receive such information from service provider 10 via the low bandwidth communication channel.

One area in which this feature of the system of FIG. 1 is useful is locating and then downloading large files. Locating such files typically involves searches in which relatively small amounts of information are transferred between customer premise equipment 20 and service provider 10, and consequently, the low bandwidth communication channel can be used for the search. Once the file has been located, the user will wish to transfer it as quickly as possible to customer premise equipment 20, and at this point, the system of FIG. 1 can use the high bandwidth communication channel to download the large file.

The following portions of this patent application describe in detail how software systems executing in control processor 48 and personal computer 74 of the system of FIG. 1 cooperate to control the use of low- and high bandwidth communications channels between customer premise equipment 20 and service provider 10 and make it possible for a user of customer premise equipment 20 to switch between using the low bandwidth communications channel and the high bandwidth communications channel to communicate with enhanced service provider 10 as best suits his interaction with enhanced service provider 10. The following portions further describe a number of ways in which the software systems which control the use of the channels may be distributed across the components of system 1 and of other versions of system 1 and billing techniques which take the use of the two channels into account.

Figure 6:
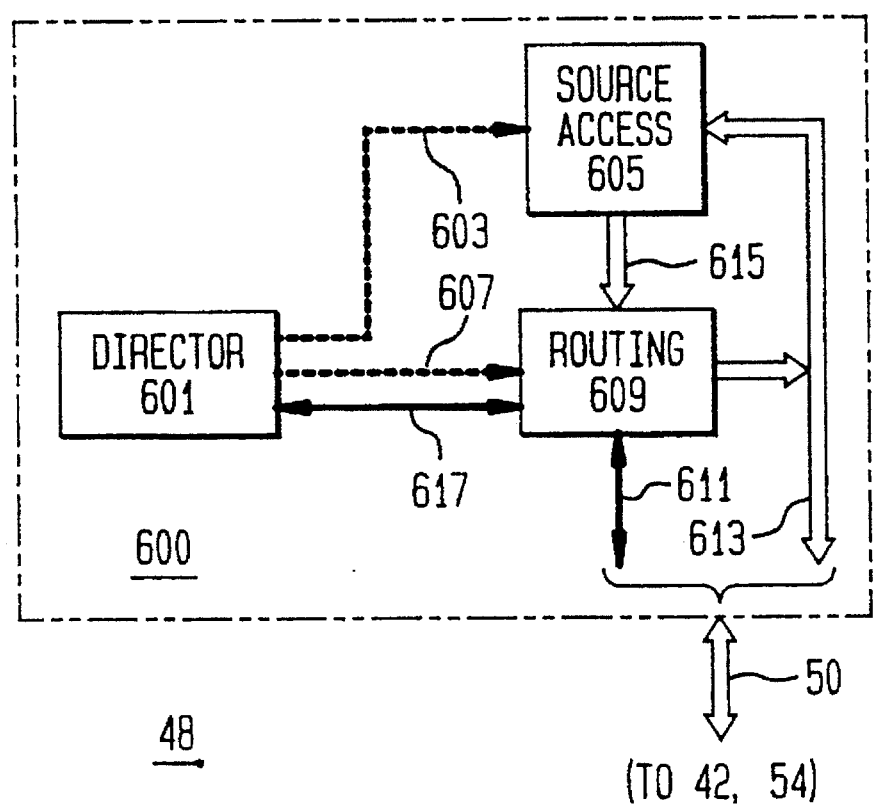
FIG. 6 is a block diagram of the control architecture employed in control processor 48.

Overview of the Channel Control System: FIG. 6

In a preferred embodiment, the system for switching between the low bandwidth communications channel and the high bandwidth communications channel is implemented in control processor 48 of split channel bridging unit 18. FIG. 6 shows this system 601. System 601 is implemented by means of programs executing on microprocessor 90. The program code for the programs and the data used by the programs are stored in memories 93 and 94 and data base 96. In a preferred embodiment, control processor 90 is a work station built by Sun Microsystems, Inc., and operating under control of a multi-process operating system of the general type represented by the UNIX operating system. (UNIX is a registered trademark of the X Open foundation.)

In FIG. 6, boxes represent components of system 600, dashed arrows represent control inputs, single-line solid arrows represent low bandwidth communications channels, and double-line solid arrows represent high bandwidth communications channels. As shown in FIGS. 2 and 1, control processor 48 is connected with the rest of the system of FIG. 1 by ethernet 50. In the embodiment of FIG. 1, ethernet 50 is the transport for both high- and low bandwidth communications channels. Ethernet 50 is connected to hub 52, which provides input to the low bandwidth channels from modems 54 and output from those channels to modems 54 and also provides input to the high bandwidth channels from router 42 and output therefrom to router 42.

Beginning with director 601, director 601 responds to messages received from customer premise equipment 20 via public switched telephone network 24 (arrows 611 and 617) by controlling the other components to establish a bidirectional low bandwidth (low-speed) channel (611) and a unidirectional high bandwidth (high-speed) channel (613) between customer premise equipment 20 and one of the enhanced service providers 10. Control is shown by arrows 603 and 607.

Source access component 605 is the component which actually establishes a channel to enhanced service provider 10. In the preferred embodiment, the channel is a high bandwidth channel between the service provider and split channel bridging unit 18. Routing component 609 controls routing of data between enhanced server 10 and customer premise equipment 20 by hub 52 and router 42. How routing component 609 does the routing is determined by director 601. The default routing is via the bidirectional low bandwidth channel, i.e., in the preferred embodiment, data transfer between enhanced service provider 10 and customer premise equipment 20 is via elements 12, 14, 16, 38, 42, 52, 54, 26, 24, and 22 of FIG. 1; director 601 may however also cause routing component 609 to establish a unidirectional high bandwidth channel, i.e., data transfer is via components 12, 14, 16, 38, 40, 42, 4.4, 46, 28, 30, and 36.

Figure 7:
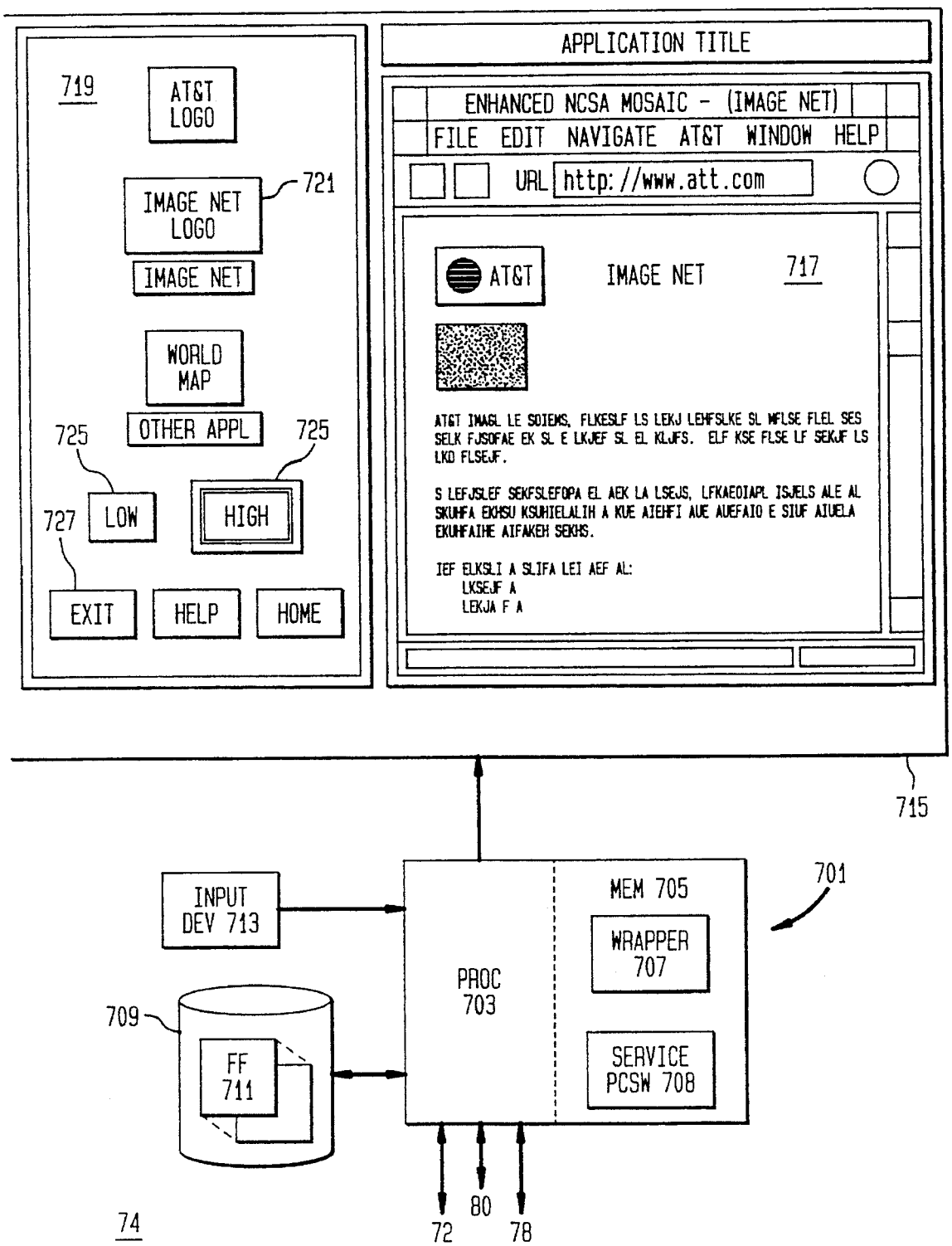
FIG. 7 is a diagram of the architecture for the graphical user interface employed in personal computer 74.

User Control of the Low and High Bandwidth Channels: FIG. 7

In a preferred embodiment, director 601 determines which channel is to be used to transfer data between customer premise equipment 20 and a service provider 10 in response to messages received on the low bandwidth channel (611, 617) from customer premise equipment 20. The messages originate in personal computer 74, which is operating under control of a wrapper program. FIG. 7 shows details of personal computer 74 and of the graphical user interface it produces to permit users of customer premise equipment 20 to select either the low bandwidth or high bandwidth channel.

Personal computer 701 has the usual components: a processor 703, memory 705, a disk storage system 709, a display 715, and an input device such as a mouse or keyboard 713. Processor 703 is coupled to the bidirectional low bandwidth channel via items 78 and 76 of FIG. 1 and to the high bandwidth channel via items 72, 70, 68, and 58 and can consequently receive data via the high bandwidth channel and both provide and receive data via the low bandwidth channel. Connection 80, finally, permits control of home controller 70 by processor 703.

Disk storage system 709 contains data and programs, including wrapper program 707 and PC user interface programs for the service providers 10. When a program is being executed by processor 703, the portion currently being executed and the data required for that portion are in memory 705; otherwise, the program and any persistent data are stored in disk storage system 709. In a preferred embodiment, the persistent data includes information used to make the screens displayed in display 715, which is stored in frame files (FF) 711 in disk system 709.

Operation of the system of FIG. 1 under control of system 600 and wrapper program 707 is in overview as follows: A user who wishes to use a service provider 10 has invoked wrapper program 707, which has established a low bandwidth channel between personal computer 74 and control processor 48, and can now send messages to and receive messages from director 601. In response to a user selection of a service provider during execution of wrapper 707, wrapper 707 establishes a connection via a low bandwidth channel to director 601 and specifies service provider 10. Director 601 then causes source access 605 to access service provider 10 via a high bandwidth channel and causes routing 609 to use the bidirectional low bandwidth channel between service provider 10 and personal computer 74 to communicate between personal computer 74 and service provider 10. With the channel established, wrapper 707 begins execution of service provider PC software 708, which then communicates via the low bandwidth channel established by wrapper 707 and director 601 with service provider 10. In some embodiments, service provider PC software 708 may be downloaded to PC 74 after the low bandwidth channel has been established. As will be explained in detail below, either the low or high bandwidth channel may be used for downloading.

At this point, display 715 has on it what is shown in FIG. 7. Display 15 has two main windows: a service window 717, which displays information from the service (the information may be either stored locally in memory 705 or received from service provider 10) and a wrapper control window 719. The important pans of wrapper control window 719 for the present discussion are window 721, which indicates what service presently has control of window 717, and low button 723 and high button 725. As their names imply, these buttons determine which channel is being used to send information from service provider 10 to personal computer 74. Low button 723 is the default. In this configuration, the bidirectional low bandwidth channel is used to transfer data in both directions between personal computer 74 and service provider 10; when the user uses input device 713 to "push" high button 725, the configuration changes so that both the low and high bandwidth channels are available, with the high bandwidth channel being used to transfer data from service provider 10 to personal computer 74. To return to use of only the low bandwidth channel to transfer the data from service provider 10 to personal computer 74, the user "pushes" low button 723.

Of course, what actually happens when a user employs input device 713 to "push" high button 725 or low button 723 is that wrapper program 707 receives an input from the windowing system which produces display 7 15 indicating that the button has been pushed. Wrapper program 707 then responds to the input by sending a message via the low bandwidth channel to director 601 indicating that the user has selected either low or high bandwidth. Director 601 then responds to the message by causing muting component 609 to route the outputs from service provider 10 as desired by the user.

In other embodiments, the channel selection message may come from service provider 10 as well as from the user. One example of a situation in which the service provider might provide the message is if the service provider needs to download service PC software 708. In that case, the service provider 10 may send a message which causes director 601 to select the high bandwidth channel during downloading and then causes director 601 to revert to the low bandwidth channel for user interactions with the service. Another example of a situation in which the channel selection might come from service provider 10 is the following: when the user requests a file, service provider 10 might determine whether to use the high bandwidth channel or the low bandwidth channel according to the size of the file.

DETAILS OF AN IMPLEMENTATION OF SYSTEM 600: FIGS. 8–18

This section describes the details of an implementation of system 600. In the figures for this section, circles represent processes provided by the UNIX operating system. If a dotted line connects one process to another, the second process is a child of the first. The wide arrow represents a high bandwidth channel, the narrow arrow a low bandwidth channel, and arrows consisting of single lines the flow of information through the channels. The figures show the following steps in an example routing session:

Telephone Line Idle

Telephone Line Connected

Wrapper 707 Connects to Director 601

Director Slave Created

Communication via Low Bandwidth Channel

User Requests High Bandwidth Communication

Director 601 Asks Router 609 for Permission for High Bandwidth

Communication

Permission Granted

Adding High Bandwidth Route to Routing Table

High Bandwidth Accept Message

Communication via High Bandwidth Channel

Figure 8:
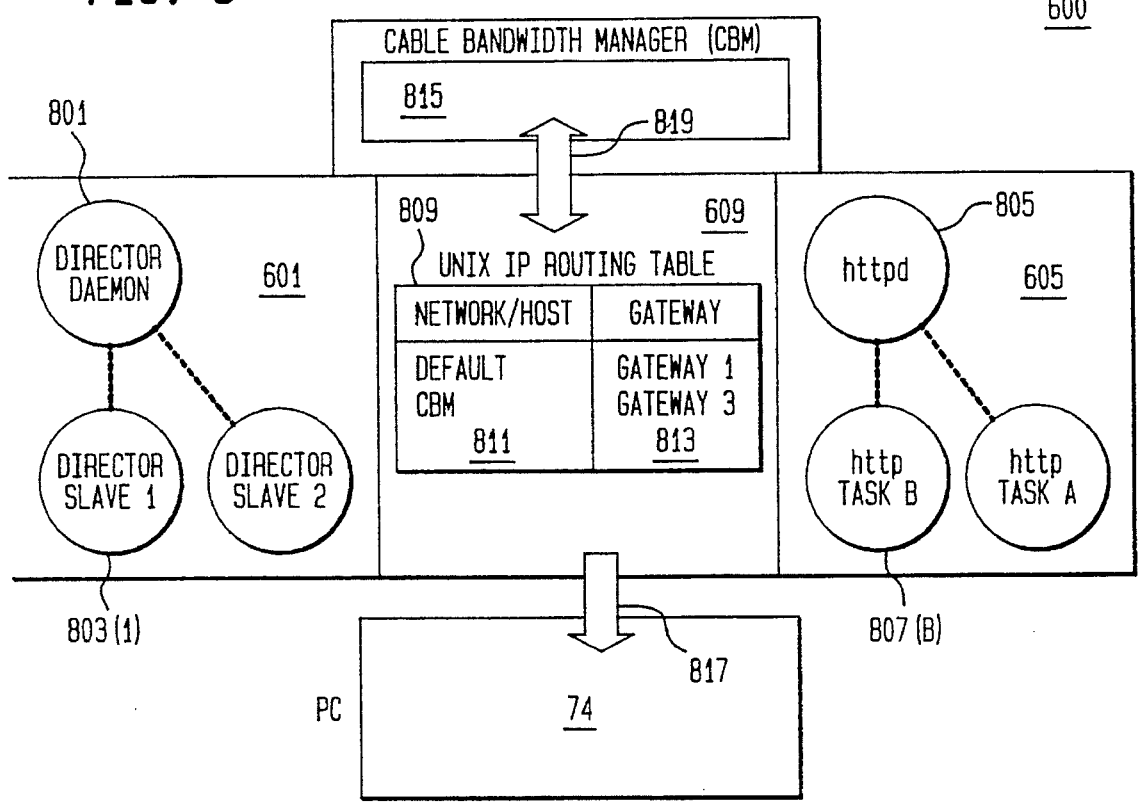
FIG. 8 is a first detailed diagram of the control architecture.

FIG. 8 represents the initial state where telephone line 22 from customer premise equipment 20 is idle and PC 74 is connected to high bandwidth channel 817 but is receiving no data from it. As shown in FIG. 8, both director 601 and source access 605 are implemented using a set of UNIX processes. The processes 805 and 807(a..n) in source access 807 implement a World Wide Web server which uses the HyperText Transfer Protocol (http). http Daemon (httpd) 805 services incoming http requests by spawning task processes 807 to handle those requests. In FIG. 8, all of the task processes 807 are currently serving other PC users. Routing table 809 in routing 609 routes communications between service providers, system 600, and the PC. Routing table 809 specifies networks or hosts in part 811 and gateways in part 813 by means of which communications to or from the host or network will be routed. There are always two channels in routing table 609: one, gateway 1, which routes communications using the low bandwidth channel between the PC, the director, and the service provider, and another, gateway 3, which routes high bandwidth control communications between cable bandwidth manager 815, which manages the bandwidth available from the cable system, and the other components of routing 609. The high bandwidth control communications travel via high bandwidth channel 819.

Figure 9:
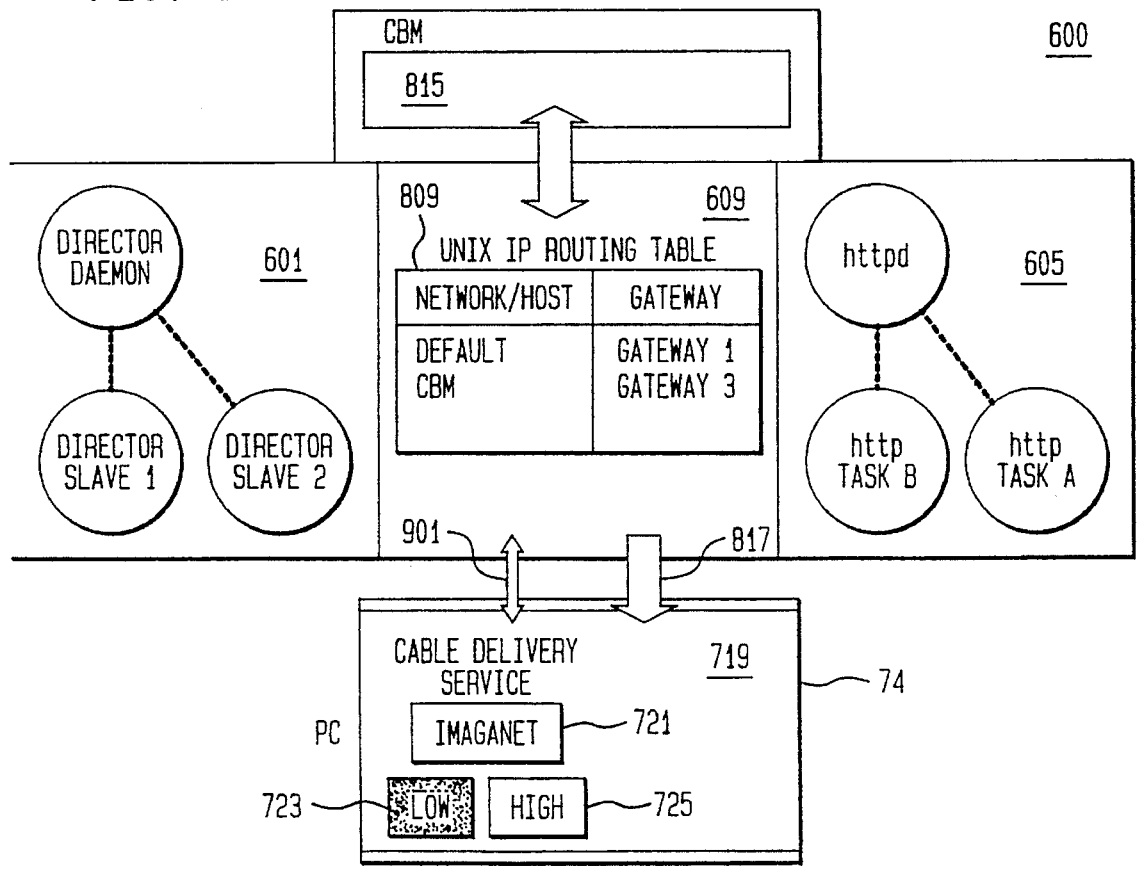
FIG. 9 is a second detailed diagram of the control architecture.

FIG. 9 shows the state of system 600 after the user of PC 74 user has started executing wrapper program 707. Invocation of wrapper 707 has caused wrapper window 719 to appear in display 715 of PC 74 and has also caused TCP/IP software on PC 74 which has been pre-configured with the telephone number of a service provider 10 to bring up a low bandwidth channel to routing 609. Routing 609 routes the channel via gateway 1. The low bandwidth channel appears in the Figure as narrow two-headed arrow 901 between PC 74 and system 600. Note that wide single-headed arrow 817 signifies the downstream connection between the cable TV system and PC 74. This connection is always physically present, but is not yet being used as a high bandwidth channel for carrying data from a service provider 10 to this particular PC 74, and consequently there is as yet no entry for such a high bandwidth channel in routing table 809. The cable TV connection is shared among multiple users and will only be carrying data destined for this PC 74 when the PC's high bandwidth channel has been established and service provider 10 is sending data to this PC.

Figure 10:
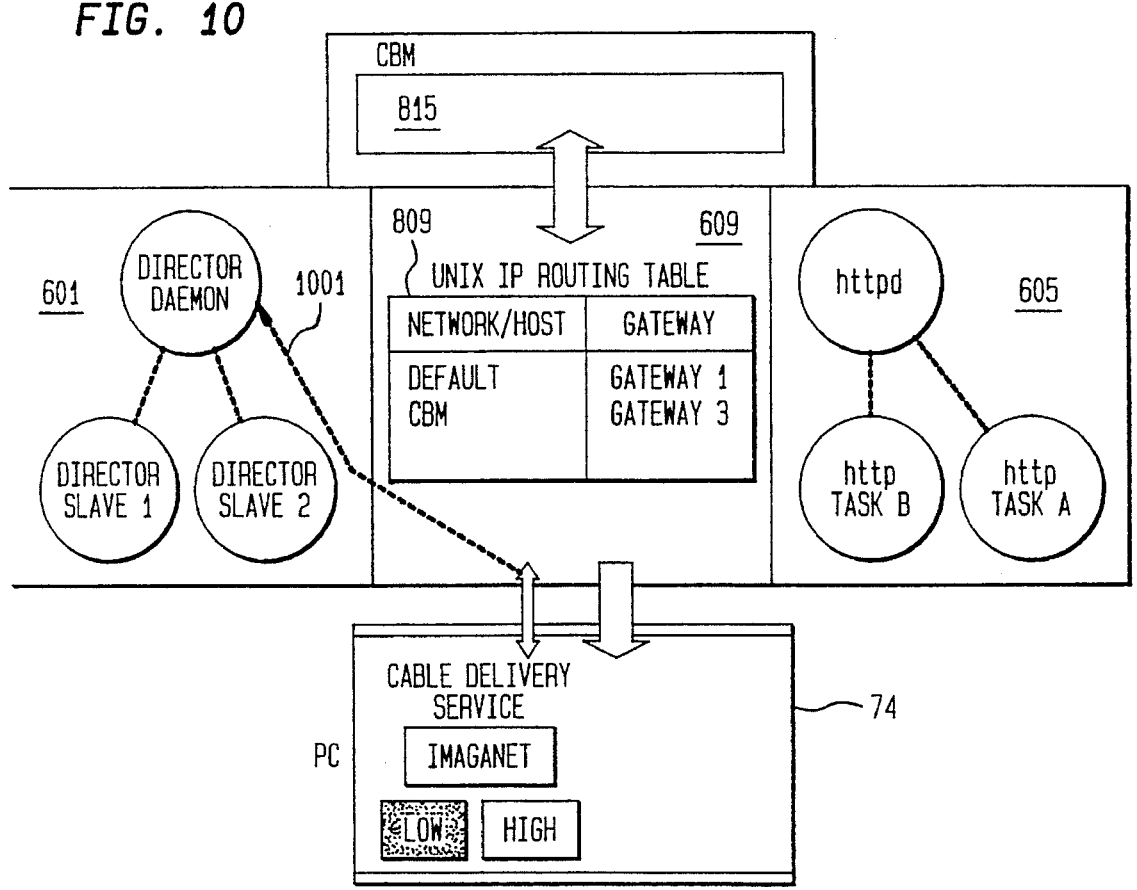
FIG. 10 is a third detailed diagram of the control architecture.

FIG. 10 shows that wrapper program 707 next initiates a TCP socket connection 1001 to director 601. Director 601 directs data from service provider 10 processor to either the low bandwidth path or the high bandwidth path to the PC. In this architecture, the direction is done (as will be shown in later figures) by adding a high bandwidth host specific route for a particular PC to routing table 809, or by deleting it. The default gateway out of routing 609 is always low bandwidth. When an entry is added to routing table 809, it overrides the low bandwidth default.

Figure 11:
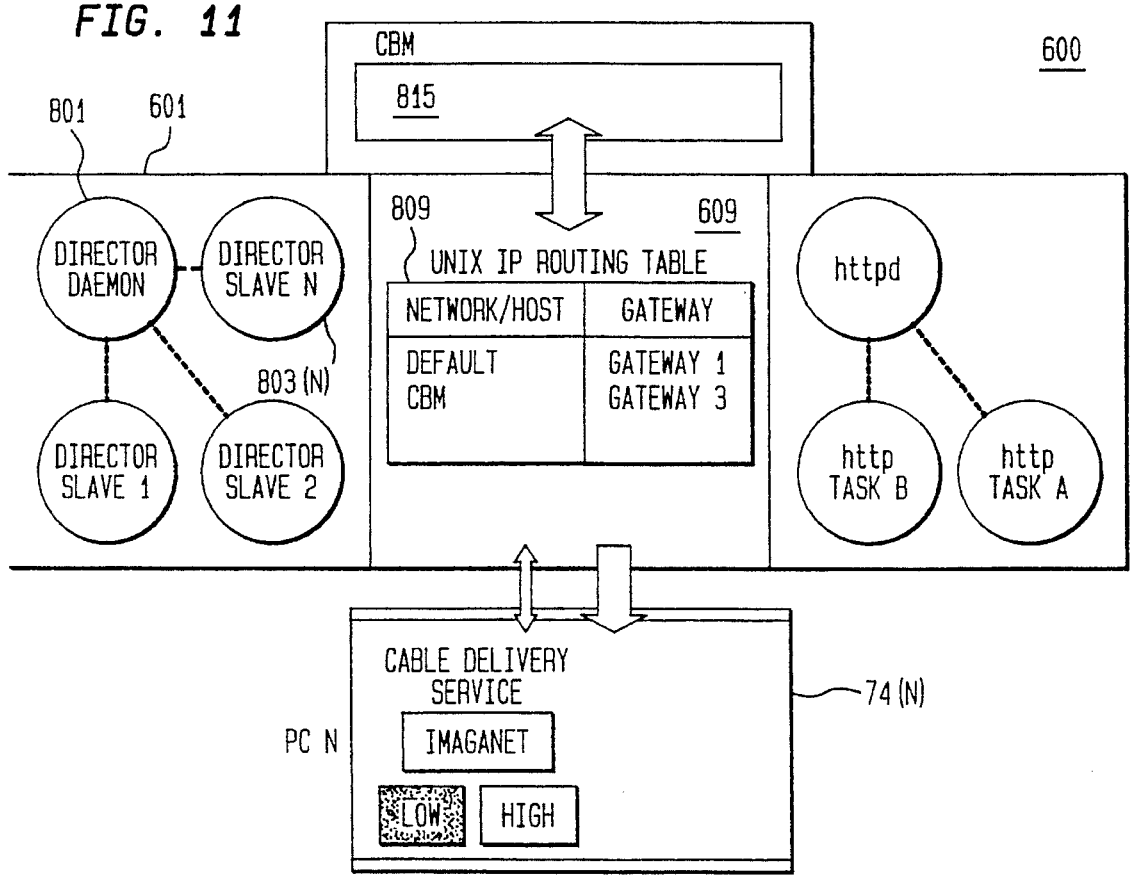
FIG. 11 is a fourth detailed diagram of the control architecture.

In FIG. 11, the incoming TCP connection request from the PC causes director daemon process 801, which is always listening to the low bandwidth channel of gateway 1, to fork a director slave process 803(N) for this PC, which will now be called PC 74(N). All further message communication between wrapper 707 and director 601 will be with director slave process 803(N). When the TCP socket connection is fully established, wrapper 707 in PC 74(N) forwards the IP address of the PC and the PC user's ID to director 601 via a "connect" message (not shown).

Figure 12:
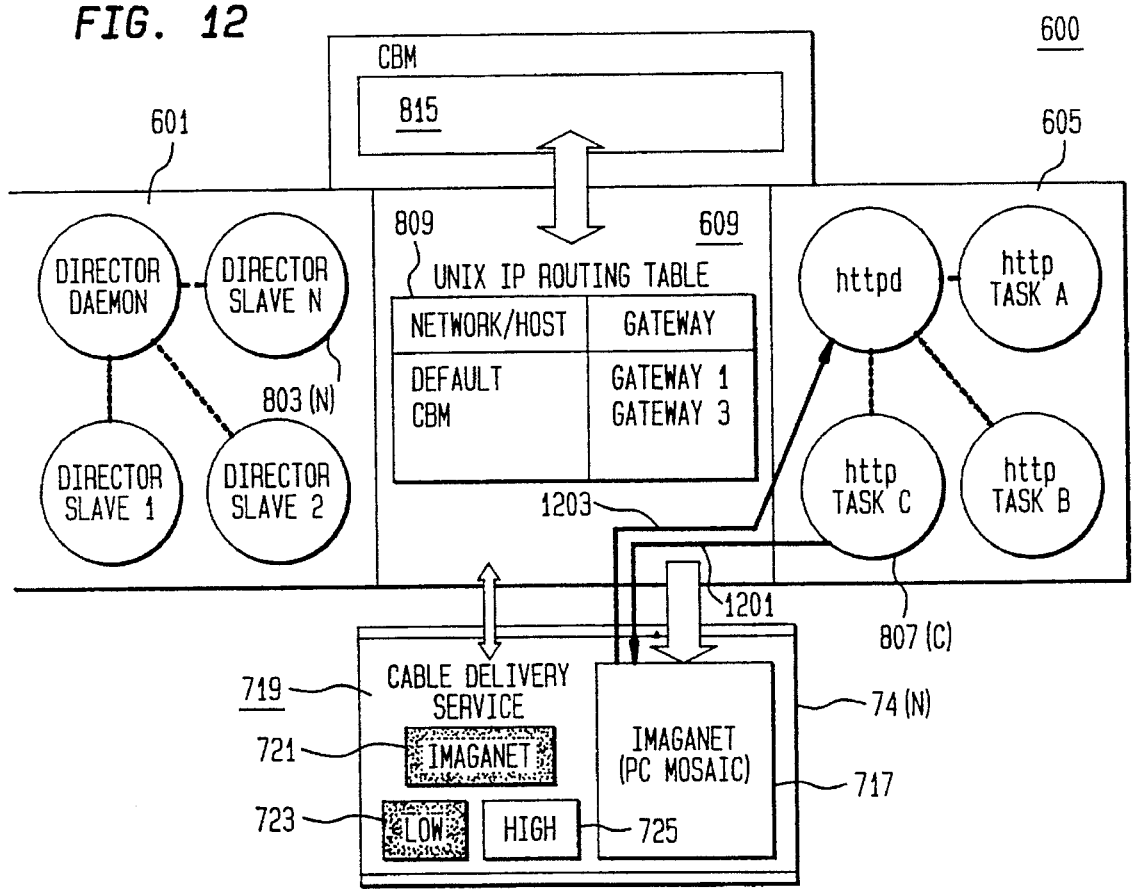
FIG. 12 is a fifth detailed diagram of the control architecture.

At this point, in FIG. 12, the user clicks on button 721 for service provider 10 in wrapper window 719 and wrapper 707 invokes the service provider 10 via the low bandwidth channel of gateway 1. The service provider's graphical user interface appears in service window 717. The user can now use service provider 10 via the low bandwidth channel. Which channel is presently in use is indicated in wrapper window 719 by highlighting of buttons 723 and 725; here, button 723 is highlighted, indicating that the low bandwidth channel is in use. Interaction with the service provider is done in service window 717. Wrapper window 719 remains on the screen merely to provide a means of requesting high speed transport.

Interaction between the user and the service provider in window 717 result in requests from service provider software 708 (in this case, PC Mosaic). These are received by httpd daemon process 805, which forks an http task process 807(c) to service the request. Data from task process 807 is returned to PC 74(n) via the route dictated by Routing Table 809, in this case, over the default low bandwidth route of gateway 1.

Figure 13:
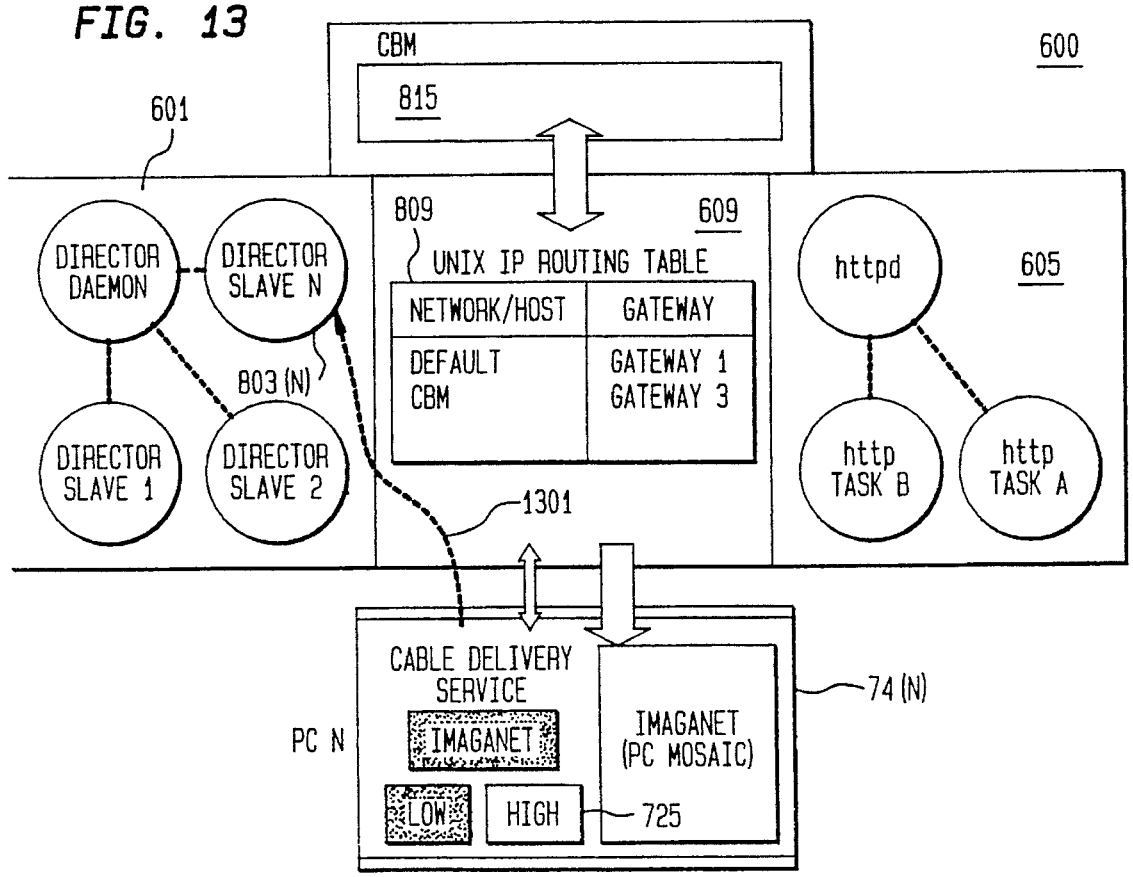
FIG. 13 is a sixth detailed diagram of the control architecture.

In FIG. 13, the user prepares to download a large image by clicking on button 725. This causes wrapper 707 to send "high_speed_request" message 1301 via low bandwidth channel 901 to director slave process 803(N). Though the user has clicked on button 725, wrapper 707 does not highlight button 725 until it gets a positive acknowledgment from director slave process 803(N), as shown in a later figure.

Figure 14:
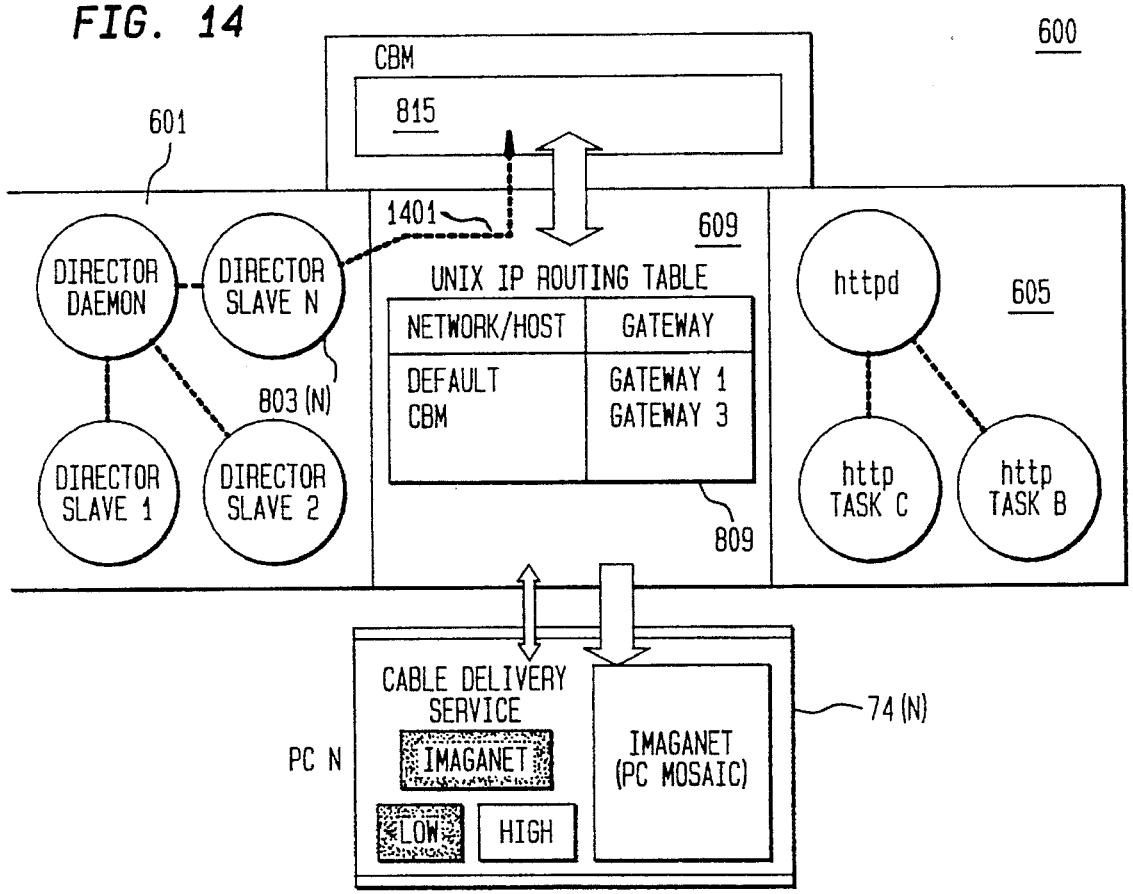
FIG. 14 is a seventh detailed diagram of the control architecture.

FIG. 14 shows what happens in system 600 upon receipt of "high_speed_request" message 1301. Director slave process 803(N) takes the user ID and IP address for PC 74(N) which were previously passed in the connect message, and passes them as parameters to a "get_cable" primitive function in director 601, which in turn sends a message 1401 to CBM component 815 of muting 609, asking if bandwidth is available for the user on one of the cable channels.

Figure 15:
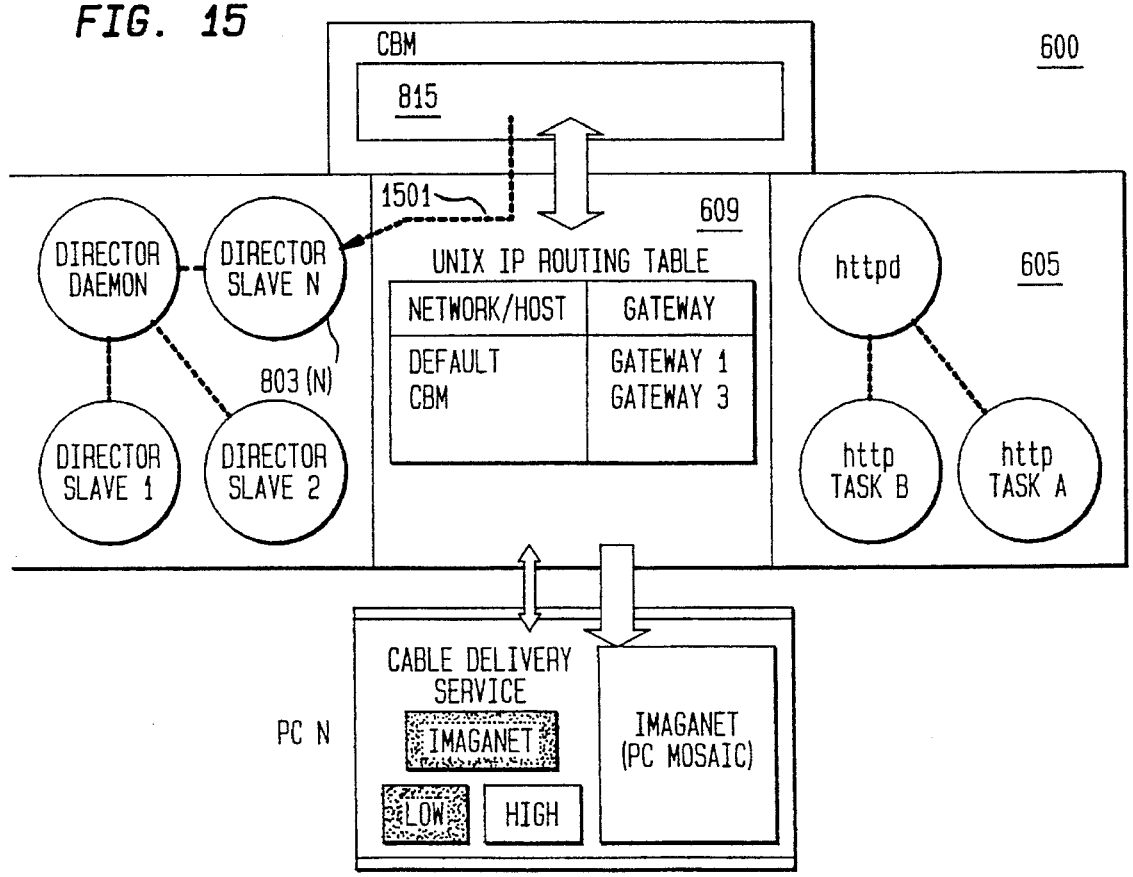
FIG. 15 is an eighth detailed diagram of the control architecture.

FIG. 15 shows how a high bandwidth channel is assigned to PC 74(N). CBM 815 uses a bandwidth algorithm to determine which channel, if any, to assign PC 74(N) to, and then sends a command to router 42 in order to get PC 74(N) tuned to that channel (not shown). When PC 74(N) is successfully assigned to a channel, a message 1501 comes back from CBM 815 causing the get_cable primitive to return successfully.

Figure 16:
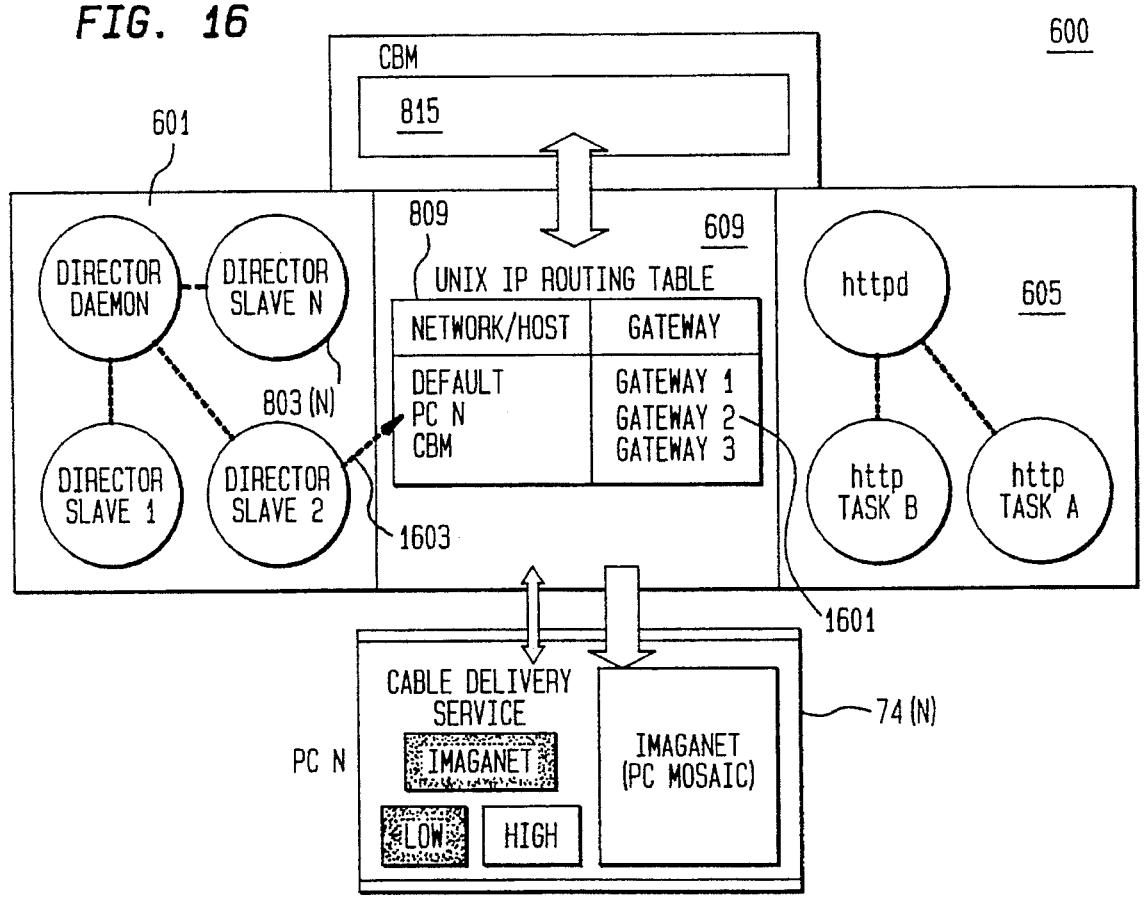
FIG. 16 is a ninth detailed diagram of the control architecture.

After the successful return from the get_cable primitive, director slave process 803(N), in FIG. 16, updates routing table 809 with a host specific entry 601 for PC 74(N) (using the IP address which was received in the connect message) to use the high bandwidth route.

Figure 17:
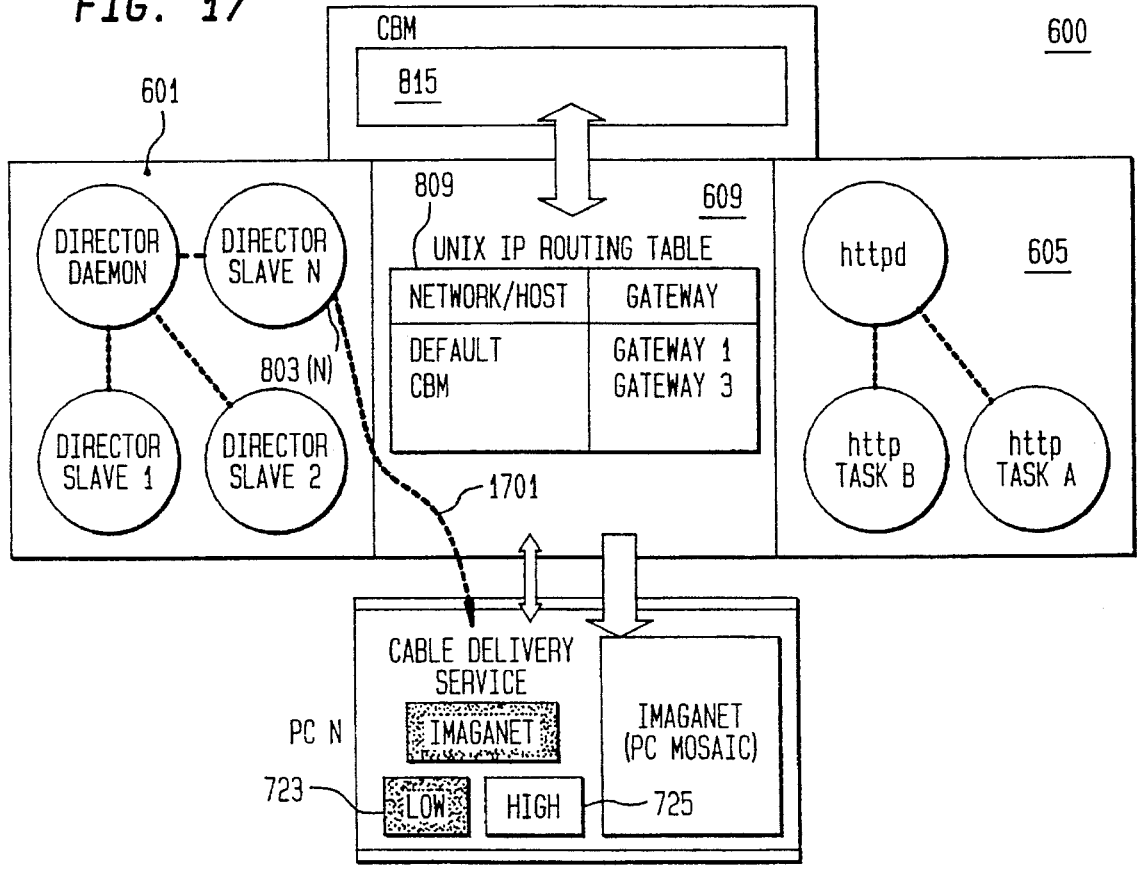
FIG. 17 is a tenth detailed diagram of the control architecture.

In FIG. 17, once routing table 809 has been updated, director slave process 803(N) sends a "high_speed_accept" message 1701 back to PC 74(N), and wrapper 707 highlights high speed button 725 instead of low speed button 723.

Figure 18:
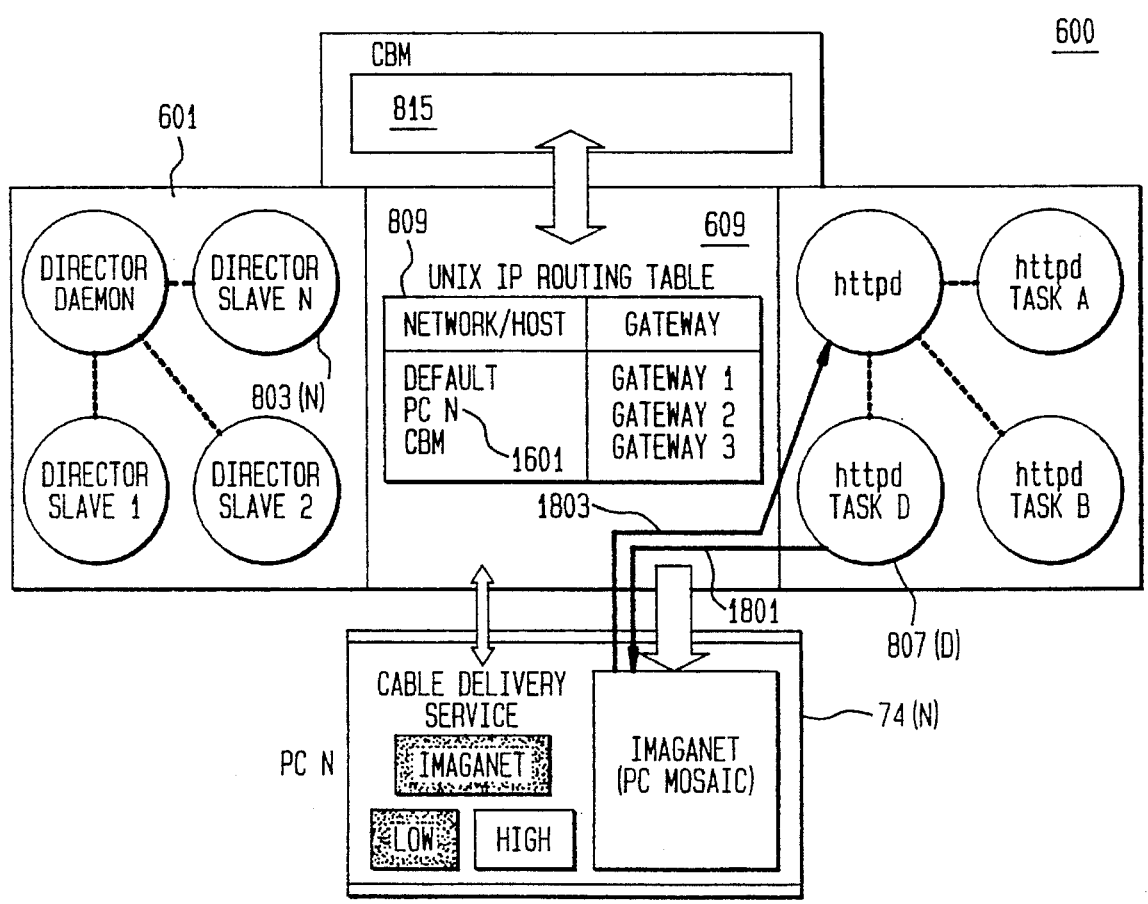
FIG. 18 is an eleventh detailed diagram of the control architecture.

As shown in FIG. 18, at this point, communication from the execution of service provider program 708 in PC 74(N) to service provider 10 continues as usual, but data from http task process 807(d) which performs the task is returned to PC 74(N) via the high bandwidth route dictated by entry 1601 in routing table 809.

Alternative Embodiments of System 600

In one alternative, there is no routing table 809. Instead, director slave process 803(N) has two TCP/IP sockets or ports to PC 74(N). One socket is for a low bandwidth channel and the other is for a high bandwidth channel. Director slave process 803(N) becomes a proxy for PC 74(N) in interacting with service provider 10's software. All data coming from service provider 10 destined for a particular PC 74(x) goes through that PC's director slave process 803(x). Director slave 803(x) then passes the data over the low bandwidth socket to PC 74(x) if the communication is to be low bandwidth, or over the high bandwidth socket to PC 74(x) if the communication requires the extra bandwidth. Advantages of this approach are that it uses the industry standard TCP/IP protocol suite and does not requiring modification of service provider 10's software. In addition, there is no constraint on the network location of service provider 10, since director slave 803(x) no longer has to have access to routing table 809. Routing table 809 remains efficient, and does not require host specific entries. There will simply be one entry for the low speed network access to the PCs and another entry for the high speed network access. Also, since all data back to PC 74 passes through director slave process 803, director slave process 803 can change speeds in the middle of a task by changing the socket it passes the data to. The main disadvantage is the converse of the advantage: all communication between the service provider and the PC must pass through director slave process 803.

Since system 600 is implemented in software, its components execute on any of the processors in system 1. Among the possible locations in addition to control processor 48 are a processor used by service provider 10 to provide its service or on an adjunct processor which has high bandwidth communications with the processor used by service provider 10. In the first case, director 601, routing 609, and source access 605 may all be implemented in the processor belonging to service provider 10; in the second case, director 601 and routing 609 may be in the adjunct processor, while service access 605 is in service provider 10's processor. When an adjunct processor is used, a single adjunct processor may control several split channel bridging units 18.

If service provider 10 is willing to change its software in order to accommodate low bandwidth channel messages and high bandwidth channel messages from PC 74, director 601 may be simply integrated into the processes 807 which perform tasks for the service 10. For example, each process 807 which performs such a task may have a low bandwidth and high bandwidth socket connecting it to PC 74. Such an integration of director 601 may be accomplished by means of library routines.

A particularly advantageous distribution of the components is the following: Connections between service provider 10 and PC 74 and between service provider 10 and the CATV system are provided by a telecommunications provider which maintains both a high speed telecommunications network and a public switched telephone network. The high speed telecommunications network is used for the connections between the telecommunications provider and service provider 10 and the CATV system, while the public switched telephone network is used for communications between PC 74 and the telecommunications provider. In such a system, source access component 605 executes in a processor belonging to service provider 10 and is completely under control of service provider 10. Director component 601 and routing component 609 execute in processors belonging to the telecommunications provider.

Implementation Details of Wrapper 707

The primary purpose of wrapper 707 is to provide the user of PC 74 with the ability to select a high or low bandwidth channel for downstream data delivery from service provider 10. It implements buttons 723 and 725 by means of which the user changes the channel and establishes a user session with director 601 during which director slave process 803 for the processor controls the downstream channel.

The wrapper provides the following functions:

Establish a TCP connection to director 601 for use as a signaling channel.

Cause an instance of a director slave process 803 to be created to handle the downstream link control.

Establish a logical session with slave process 803.

Provide a graphical user interface allowing the PC user to manually select the high speed or low speed link.

Provide convenience features to facilitate the user's access to service providers 10 by invoking browsers, and directory services, and providing access to other network tools.

When wrapper 707 begins execution, it initializes itself, then attempts to establish a TCP connection to director daemon 801. Daemon 801 listens for a connect attempt on a well-known port. When the connect occurs, director daemon 801 spawns a director slave process 803(m) to handle all subsequent transactions with that execution m of wrapper 707. Wrapper 707 initiates the connection with a connect-request message. The associated director slave 803(m) replies with a connect-acknowledge message. Once the connect-acknowledge message is received by wrapper 707, the session is established. Next, wrapper 707 paints a graphical interface 719 on the user's PC screen. Director slave process 803 waits for a message from wrapper 707. The session always begins with the downstream link set to use the low speed mode. Having set up the session and painted graphical interface 719, wrapper 707 waits for input from the user of PC 74. When the user decides to switch to the high speed link, he or she clicks button 725. Each time high speed button 725 or low speed button 723 is activated, the wrapper sends a link select message over the signalling connection to director slave 703(n). When director slave 703(n) receives a link select message, it requests permission to make the change. If permission is granted, it adds or deletes an entry in the routing table 809 and thus effects the change. Director slave 703(n) then sends a success message back to wrapper 707. When wrapper 707 receives confirmation of the link change, it highlights the corresponding link select button 723 or 725, thereby providing visual feedback to the user that the link selection process was successful.

A summary of the messages between wrapper 707 and director 601 is given below. The requests originate with wrapper 707 and the replies originate with director 601:

| | |
|---|---|
| ● CONNECT: | Used to establish a session with the director |
| | (:message connect :use_id <max 21 char string> :ip_address <char string>) |
| ● RESPONSE: | (:message connect_accept :user_id <max 21 char string>) |
| | (:message connect_reject :user_id <max 21 char string> :reason <u_int>) |
| ● HEARTBEAT: | Maintain the session connection |
| | (:message heartbeat :user id <max 21 char string>) |
| ● HIGH SPEED: | Switch to the high speed link |
| | (:message high_speed :user_id <max 21 char string> :service_class <char string>) |
| ● RESPONSE: | (:message high_speed_accept :user_id <max 21 char string>) |
| | (:message high_speed_reject :user_id <max 21 char string> :reason <u_int>) |
| ● LOW SPEED: | Switch to the low speed link |
| | (:message low_speed :user_id <max 21 char string>) |
| ● RESPONSE: | (:message low_speed_accept :user_id <max 21 char string>) |
| | (:message low_speed_reject :user_id <max 21 char string> :reason <u_int>) |
| ● QUERY: | Determine which speed is currently set |
| | (:message query :user_id <max 21 char string>) |
| ● RESPONSE: | (:message query_response :speed_setting <high_speed or low_speed>) |
| ● DISCONNECT: | End the session with the director |
| | (:message disconnect :user_id <max 21 char string>) |
| ● RESPONSE: | to any message |
| | (:message bad_user_id :user_id <max 21 char string>) |

As long as the session lasts, wrapper 707 periodically sends a heartbeat message to director slave process 803. Director slave process 803 expects to receive heartbeat messages periodically. If it does not receive a heartbeat message within a given time-out period, director slave process 803 assumes that the client or signaling link is disabled and terminates the session.

When the user is finished using the network services and activates exit button 727 in wrapper window 719, the disconnect message is sent to director slave process 803. When director slave process 803 receives this message, it closes the connection to the execution of wrapper 707 and terminates immediately. Director slave process 803 services requests from wrapper 707 until it receives a disconnect message or fails to receive a heartbeat message within the prescribed time-out window.

The wrapper GUI is implemented using several sets of graphical objects which are referred to as pages. Two of these pages constitute the static appearance of the wrapper during execution. In its initial appearance, the service page, a window covers the entire display 715. On the left side of the screen is wrapper window 719; On the right side of the screen is a frame. Service window 717 is placed within this frame.

Dynamic Reconstruction of the GUI

Wrapper 707 is implemented using a feature of the Microsoft Visual Basic GUI development system ("Microsoft" and "Visual Basic" are trademarks of Microsoft Corporation) that allows the programmer to save the configuration information about a particular graphical layout. (page) as a text file. Wrapper 707 then creates its GUI by interpreting these text files. The graphical features of the GUI are thus not built into the code for wrapper 707. Since the graphical features of the GUI are contained in text files, it is possible for a service provider 10 to download the text files for its GUI to wrapper 707, so that wrapper 707 can configure itself as required by the service provider. The technique described below can be used with any other tool in which screens are created by interpreting text files.

Instead of built-in graphical features, a preferred embodiment of wrapper 707 has a set of built in functions and a script language. The script language is used to provide dynamically-created graphic features. Each graphical feature has an associated script file. The script file contains a list of commands that are interpreted when the graphical feature is accessed. For example, the script file associated with the button specifies the visual result of pressing the button. When the button is pressed, the script file is interpreted.

To make a graphical user interface for wrapper 707, the author uses Visual Basic to creates the graphical layout in the usual manner, but does not generate any code. Once the author is satisfied with the graphical layout, the format is saved as a text file. The script files are specified in the tag field for each graphical feature on the page. Since wrapper 707 is implemented in this manner, much of its functionality can be specified and modified without code changes and recompilation of wrapper 707.

Wrapper 707 maintains the orientation and placement of its component windows through a combination of floating window implementation and message based positioning. It uses Microsoft Windows message primitives to size and place the browser application within a frame on a background as a feature on the full screen application GUI.

Service window 717 is maintained in is topmost position by sending it a TOPMOST message whenever events occur outside service window 717. These events occur whenever buttons, pictures, or other controls are click accessed on the adjacent wrapper window 719. When a click event occurs in window 719. windows makes that window object the active window. Windows also makes the active window the topmost window, which in this case would result in wrapper window 707 concealing service window 717. By sending a TOPMOST message in response to the click event, service window 717 is again activated and made the topmost window automatically. The user perceives this as a very fast refresh of the browser window. In a similar manner, the control panel is maintained on top of the background window by receiving a TOPMOST message in response to click events outside the client area.

In its remote control configuration, the wrapper retains its topmost stature through implementation as a floating window. This is an essential feature for an object that affects the entire workspace.

Other Advantages of Wrapper 707 and System 600

Because there is always a bidirectional low bandwidth channel between wrapper 707 in PC 74(N) and director slave 803(N), the fact that a user is receiving information from one service provider 10 via a high bandwidth channel does not preclude the user from commanding director slave 803(N) to connect it to another service provider 10. Director slave 803(N) can either return information from the other service provider 10 via the low bandwidth channel or obtain another high bandwidth channel. In such a situation, wrapper 707 would of course set up two service windows 717.

Another advantage of the combination of wrapper 707 and system 600 is that it offers extremely flexible billing. The processor upon which director 601 operates will typically have mass storage, and that can be used for a billing data base (data base 96 in FIG. 5, for example). First, the user has direct control over which channel is used, and will therefore easily accept differential billing rates. Second, because director slave process 803(N) switches between the low bandwidth and the high bandwidth channels as requested by the user of PC 74(N), director slave process 803(N) can easily record the information in data base 96 that is needed to do the differential billing.

Exactly what kind of billing is done in a specific instance will of course be determined by marketplace forces working on the parties providing the service and the low and high bandwidth access and the user of the service. Possibilities include:

1. flat monthly fees for unlimited use of low and high bandwidth connections: work-at-home and telecommuting users.

2. flat monthly fees for low bandwidth connection and usage sensitive pricing for high bandwidth connection 3. separate flat monthly fees for low bandwidth and high bandwidth connections: e.g., low bandwidth access to e-mail, other textual services+a separate optional class of high bandwidth services for graphic intensive services.

4. usage sensitive pricing for low as well as high bandwidth services.

5. normal billing practices for low bandwidth and transaction based pricing for high bandwidth downloads: e.g., charge $5 for download of new software package.

6. billing as in (1)–(5) but charged to the content/service provider like "800" services: e.g., AT&T bills service provider 10 and service provider 10 bills the end user.

Using the System of FIG. 1 in Telecommuting

One area of application for the system of FIG. 1 with the channel bandwidth selection mechanism of system 600 is telecommuting. Lack of bandwidth is one of the biggest problems of telecommuting. A typical information worker generally spends far more time studying information than he or she does creating new information. At the office, the information required by the worker is available through high bandwidth channels such as those provided by LANs, and the time to download information to the worker's work station is not a problem. However, when the information worker telecommutes, he or she must use the low bandwidth channels provided by modems connected to telephone lines.

Because of the low bandwidth, of these channels, it is virtually impossible for the telecommuter to work with documents which are stored as images or with very large text files. Many of these same information workers, however, have cable TV, and thus have an incoming high bandwidth channel. The system of FIG. 1 permits cable TV to be used as the high bandwidth channel for downloading information to the telecommuter, and when combined with the channel bandwidth selection mechanism of system 600, it permits downloading over either the low bandwidth or high bandwidth channel as best suits the situation.

Modern office computing systems are client-server systems in which the clients and servers are connected by networks. The servers contain objects and perform operations on those objects for their clients, which are typically processes running in PCs and other computer systems connected to the network. For example, a file server contains data files and performs file operations on those files at the request of clients; a schedule server maintains a schedule for the office and performs scheduling operations at the request of clients. Of course, a server may also be a client; for example the schedule server may keep its scheduling information in files and may thus be a client of the file server.

When the system of FIG. 1 is used for telecommuting, service provider 10 is a client in the office computing system of the office to which the user of personal computer 74 is telecommuting. What appears in service window 717 in such a system is exactly what the user of personal computer 74 would see if he or she were using his or her PC at work. Client service provider 10 has exactly the same access to the servers in the office in exactly the same way that the user has access when he or she is in the office, and can thus provide the telecommuter with the information he or she needs. Of course, if the system of FIG. 1 is implemented using system 600, either the client or the user can select the most advantageous bandwidth for downloading.

Conclusion

The foregoing Detailed Description has shown how the system of FIG. 1 of the parent patent application may be improved by the addition of channel switching apparatus which permit either the high bandwidth channel or the low bandwidth channel to be used for output of information from the service provider. In one embodiment of the invention, the channel switching apparatus is controlled by the recipient of the information; in others, it may be controlled by the source of the information.

Other embodiments may also use different transports for the channels. For example, in a system permitting two-way communication over the cable tv network, both the low bandwith channel and the high bandwidth channel might employ the coaxial cable or fiber optic cable used in the CATV system as their transport.

The Detailed Description has described a number of different implementations of the channel switching apparatus, and those skilled in the arts to which the invention pertains will immediately see that other variations are possible. Similarly, the wrapper program disclosed herein may be implemented in many different ways and may have many different graphical user interfaces. Finally, the techniques used to set up the channels and the protocols used to communicate over them will also depend on the system in which the invention is implemented.

All of the above being the case, the foregoing Detailed Description is to be regarded in all respects as illustrative and not restrictive and the scope of the inventions claimed herein is to be determined solely from the attached claims as interpreted with the full breadth permitted by the patent laws.

What is claimed is:

1. Interactive apparatus for providing a user access to remote data, the apparatus comprising:
   a low bandwidth network;
   a high bandwidth network;
   a data source for the remote data, the source being accessible via both the low bandwidth network and the high bandwidth network;
   user access means for receiving the remote data;
   coupling means for coupling the user access means to the data source, the coupling means including
   high bandwidth coupling means for coupling the user access means to the data source via the high bandwidth network and
   low bandwidth coupling means for coupling the user access means to the data source via the low bandwidth network; and
   coupling control means coupled to the user access means via the low bandwidth network and to the coupling means for responding to a first access command by causing the low bandwidth coupling means to bidirectionally couple the user access means to the source via the low bandwidth network and to a second access command by causing the high bandwidth coupling means to unidirectionally couple the user access means to the source via the high bandwidth network.

2. The apparatus set forth in claim 1 wherein:
   the user access means is a source of the first and second access commands.

3. The apparatus set forth in claim 1 wherein:
   the coupling control means is additionally coupled to the data source; and
   the data source is a source of at least the second access command.

4. The apparatus set forth in claim 2 wherein:
   the user access means further includes user input means and
   the user access means provides the first and second access commands in response to the user input means.

5. The apparatus set forth in claim 1 wherein:
   the user access means remains coupled to the coupling control means while the user access means is coupled via the high bandwidth network to the source.

6. A user interface employed in a computer system which includes user input means and display means and which is coupled to a low-bandwidth network for which the computer system is both source and sink and to a high-bandwidth network for which the computer system is only sink and which provides a command to means for coupling a remote data source to the high bandwidth network or the low bandwidth network, the user interface comprising:
   an indication in the display means which indicates whether the computer system is receiving data from the data source via the high bandwidth network or the low bandwidth network; and
   means responsive to an input on the user input means indicating a change in bandwidth for providing a command for the change to the means for coupling.

7. An improved information access system, the system being of the type which has a low bandwidth channel from an information destination to an information source and a high bandwidth channel in the reverse direction, the low bandwidth channel being used for control information and the high bandwidth channel being used for output information output from the information source to the information destination in response to the control information, the improvement comprising:

a bidirectional low bandwidth channel; and means coupled to the low bandwidth channel and responsive to a bandwidth selection message received thereon for selecting either the low bandwidth channel or the high bandwidth channel for transferring the output information from the source to the destination in accordance with the message.

* * * * *